(12) United States Patent
Nakao et al.

(10) Patent No.: US 12,149,114 B2
(45) Date of Patent: Nov. 19, 2024

(54) BATTERY CONTROL APPARATUS

(71) Applicant: VEHICLE ENERGY JAPAN INC., Hitachinaka (JP)

(72) Inventors: Ryohhei Nakao, Tokyo (JP); Keiichiro Ohkawa, Hitachinaka (JP); Yasuo Arishima, Hitachinaka (JP); Hironori Sasaki, Hitachinaka (JP)

(73) Assignee: VEHICLE ENERGY JAPAN INC., Ibaraki (JP)

( * ) Notice: Subject to any disclaimer, the term of this patent is extended or adjusted under 35 U.S.C. 154(b) by 570 days.

(21) Appl. No.: 17/427,182

(22) PCT Filed: Dec. 4, 2019

(86) PCT No.: PCT/JP2019/047426
§ 371 (c)(1),
(2) Date: Jul. 30, 2021

(87) PCT Pub. No.: WO2020/158182
PCT Pub. Date: Aug. 6, 2020

(65) Prior Publication Data
US 2022/0131400 A1      Apr. 28, 2022

(30) Foreign Application Priority Data
Jan. 31, 2019   (JP) ................. 2019-015907

(51) Int. Cl.
*H02J 7/00*       (2006.01)
*B60L 58/14*    (2019.01)
*H01M 10/48*  (2006.01)

(52) U.S. Cl.
CPC ........ *H02J 7/007182* (2020.01); *B60L 58/14* (2019.02); *H01M 10/48* (2013.01); *H02J 7/0047* (2013.01)

(58) Field of Classification Search
USPC ........................................ 320/134
See application file for complete search history.

(56) References Cited

U.S. PATENT DOCUMENTS 10,594,002 B2   3/2020   Matsui et al.
10,971,767 B2   4/2021   Matsui et al.
(Continued)

FOREIGN PATENT DOCUMENTS

JP    2010-268642 A    11/2010
JP    2013-188100 A     9/2013
(Continued)

OTHER PUBLICATIONS

Japanese Office Action dated Aug. 23, 2022 for Japanese Patent Application No. 2020-569416.
(Continued)

*Primary Examiner* — Bryce M Aisaka
(74) *Attorney, Agent, or Firm* — Volpe Koenig

(57) ABSTRACT

An appropriate upper limit voltage is set to enable maximum charging performance of a secondary battery to be exhibited while effectively suppressing degradation of the secondary battery. An assembled battery control unit determines an upper limit voltage during charge of the secondary battery and calculates chargeable power of the secondary battery based on the upper limit voltage. The assembled battery control unit has an upper limit voltage calculating unit which calculates a voltage history of the secondary battery based on time series data of a voltage of the secondary battery and which calculates the upper limit voltage based on the voltage history.

11 Claims, 23 Drawing Sheets

(56) References Cited

U.S. PATENT DOCUMENTS

2018/0053971 A1    2/2018  Matsui et al.
2018/0358663 A1*  12/2018  Yonemoto ............... B60L 58/16
2018/0375176 A1*  12/2018  Sakabe ............... H02J 7/00714
2020/0168958 A1    5/2020  Matsui et al.

FOREIGN PATENT DOCUMENTS

JP    2017-107763 A    6/2017
WO    2016/159086 A1   10/2016

OTHER PUBLICATIONS

International Search Report, PCT/JP2019/047426, Feb. 4, 2020, 8 pgs.

* cited by examiner

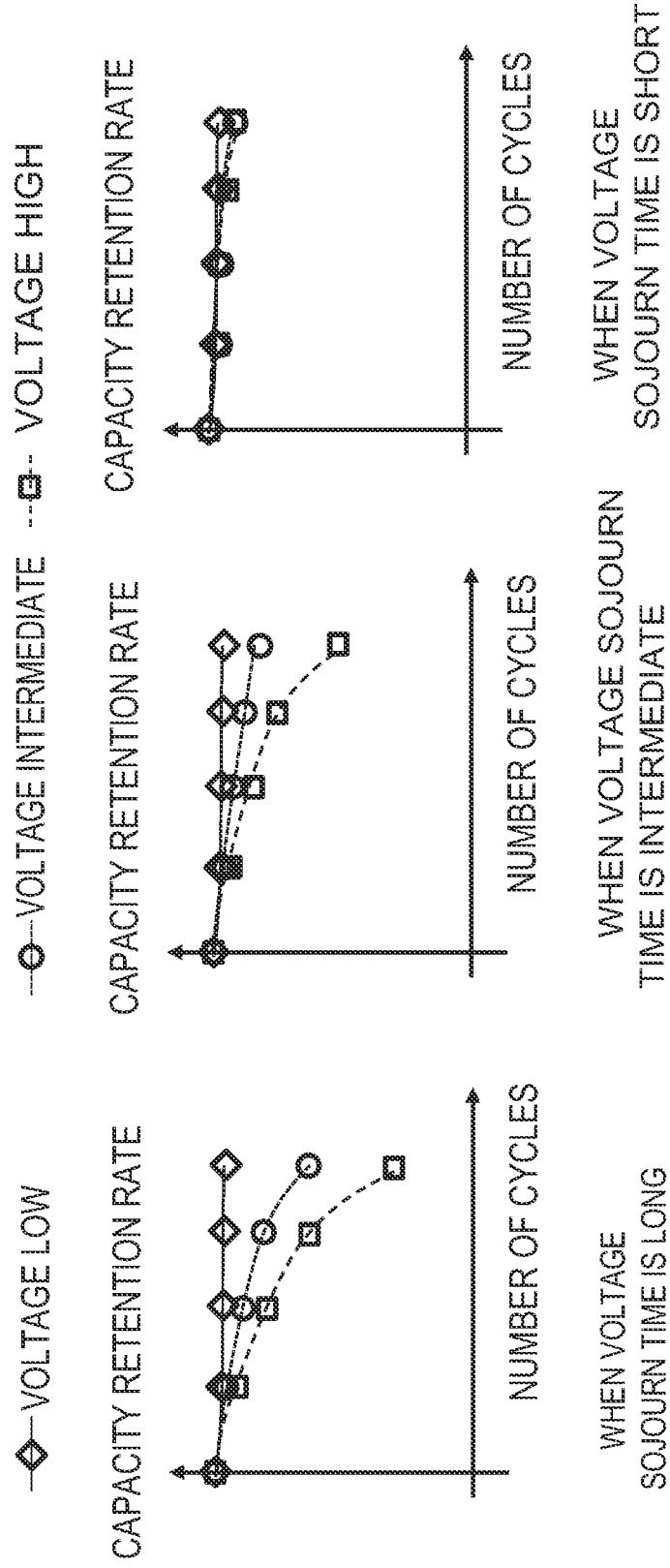

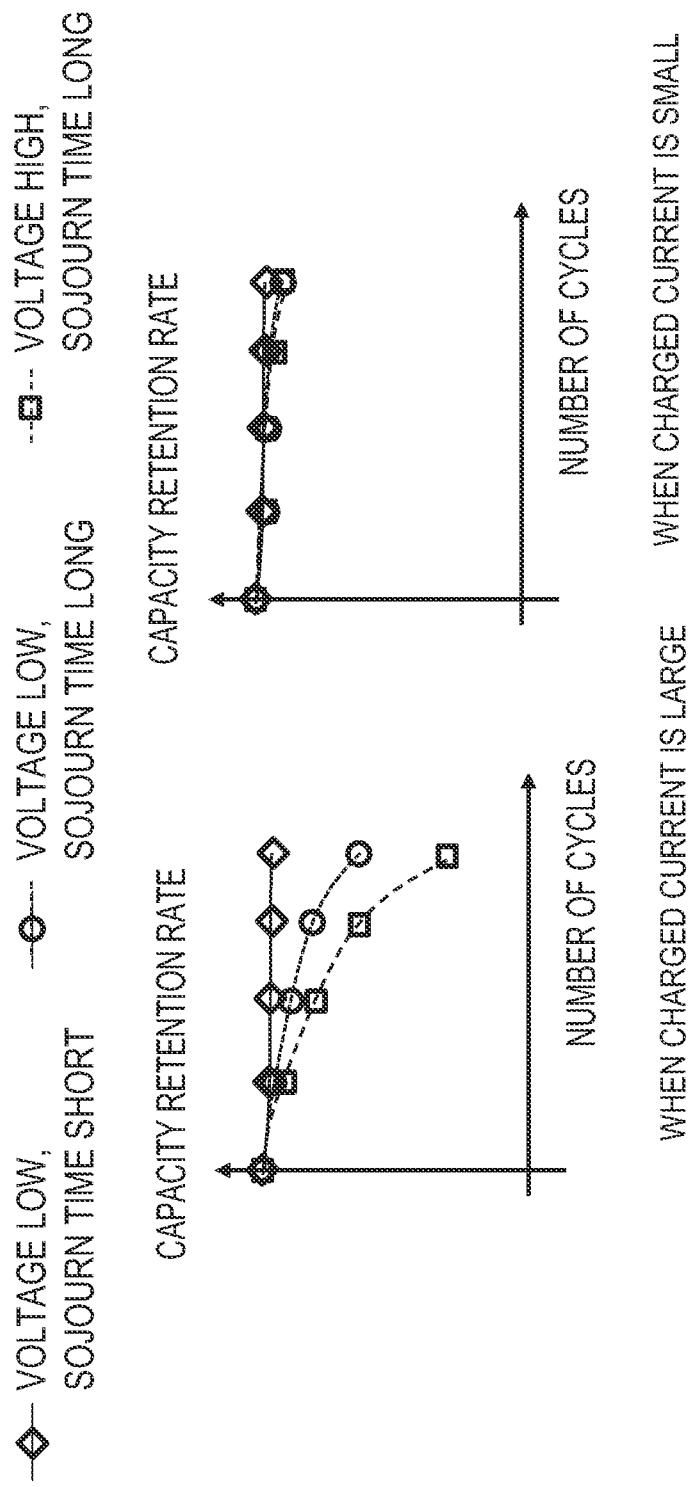

WHEN FILTER TIME (TIME WINDOW) IS LONG AND CURRENT AVERAGE VALUE IS SMALL

WHEN FILTER TIME (TIME WINDOW) IS LONG AND CURRENT AVERAGE VALUE IS LARGE

WHEN FILTER TIME (TIME WINDOW) IS SHORT AND CURRENT AVERAGE VALUE IS SMALL

WHEN FILTER TIME (TIME WINDOW) IS SHORT AND CURRENT AVERAGE VALUE IS LARGE

FIG. 19

| CURRENT\VOLTAGE | 3.6 | 3.8 | 4.0 | 4.2 |
|---|---|---|---|---|
| -100 | 0.1 | 0.1 | 0.1 | 0.1 |
| -50 | 0.1 | 0.1 | 0.1 | 0.1 |
| 0 | 0.5 | 0.5 | 0.5 | 0.5 |
| 50 | 0.7 | 0.7 | 0.9 | 0.9 |
| 100 | 0.8 | 0.9 | 1 | 1 |
| 200 | 0.8 | 0.9 | 1 | 1 |

BATTERY CONTROL APPARATUS

FIELD OF INVENTION

The present invention relates to a battery control apparatus.

BACKGROUND ART

A battery system that is mounted on an electric vehicle (EV), a plug-in hybrid electric vehicle (PHEV), a hybrid electric vehicle (HEV), and the like is generally constituted of a plurality of secondary batteries, coupled in series or in parallel, and various electric components. The electric components include a relay for controlling on/off states of electric coupling between a battery and a load, sensors for measuring a current and a voltage of the batteries, and a battery control apparatus that performs charge/discharge control of the batteries.

The battery control apparatus sets a limit value (an upper limit voltage) to a voltage of a battery to ensure that the battery is used within an appropriate range, and performs charge/discharge control of the battery within a range of this upper limit voltage. Accordingly, the battery is prevented from being overcharged, thereby suppressing degradation of the battery.

Generally, in a lithium-ion battery that is often used as a secondary battery, particularly at a low temperature, when a potential of a negative electrode (a potential with lithium metal as a reference) is low, in other words, when a battery voltage is high, lithium metal may possibly become deposited on a negative electrode surface. Since deposition of the lithium metal reduces an amount of lithium ions that otherwise would have been used for charge/discharge, a chargeable/dischargeable capacity of the battery decreases. Furthermore, as the deposition of the lithium metal proceeds on the negative electrode, the lithium metal grows in an icicle shape and comes into contact with a positive electrode side and, in a worst case scenario, an internal short-circuit may occur. For this reason, in a battery control apparatus, an upper limit voltage has to be set so as to appropriately limit the battery voltage and prevent deposition of lithium metal.

A technique described in PTL 1 is known as a method for controlling an upper limit voltage of a battery. PTL 1 discloses a technique for suppressing deposition of lithium metal in a lithium-ion secondary battery by calculating a negative electrode potential difference based on input/output currents of the battery and setting an allowable upper limit voltage of the battery by using the calculated negative electrode potential difference.

CITATION LIST

Patent Literature

[PTL 1] Japanese Patent Application Laid-open No. 2010-268642

SUMMARY

Technical Problem

An upper limit voltage to be set to a battery by a battery control apparatus varies in accordance with a state of use of the battery. In particular, in order to set an upper limit voltage that enables maximum charging performance of a lithium-ion battery to be exhibited while effectively suppressing deposition of lithium metal in the battery, a voltage history of the battery or, in other words, at what voltage the battery had been used up to the present time, is an important element. However, while the technique described in PTL 1 takes input/output currents of a battery into consideration for setting an upper limit voltage, no consideration is given to a voltage history. Therefore, an upper limit voltage that enables maximum charging performance of a secondary battery to be exhibited while effectively suppressing degradation of the secondary battery cannot be set.

Solution to Problem

A battery control apparatus according to the present invention estimates an upper limit voltage of a secondary battery based on a voltage of the secondary battery, the battery control apparatus including an upper limit voltage calculating unit which calculates a voltage history of the secondary battery based on time series data of a voltage of the secondary battery and calculates the upper limit voltage based on the voltage history.

Advantageous Effects of Invention

According to the present invention, an appropriate upper limit voltage can be set to enable maximum charging performance of a secondary battery to be exhibited while effectively suppressing degradation of the secondary battery.

BRIEF DESCRIPTION OF THE DRAWINGS

FIGS. 6A-C are diagrams showing an example of a cycling test result according to the first embodiment of the present invention.

FIGS. 13A and 13B are diagrams showing an outline of an upper limit voltage map according to the second embodiment of the present invention.

FIGS. 16A and 16B are diagrams showing an example of a cycling test result according to the third embodiment of the present invention.

FIG. 19 is a diagram showing an outline of a weight coefficient map according to the fourth embodiment of the present invention.

DETAILED DESCRIPTION

Hereinafter, embodiments of the present invention will be described with reference to the drawings. In the following embodiments, a case where the present invention is applied to a battery system that constitutes a power supply of a plug-in hybrid electric vehicle (PHEV) will be described as an example. However, configurations of the embodiments described below are not limited thereto and the present invention can also be applied to a capacitor control circuit of a power storage apparatus of the like that constitutes a power supply of an automobile such as a hybrid electric vehicle (HEV) or an electric vehicle (EV) or an industrial vehicle such as a hybrid railroad vehicle.

In addition, while a case of adopting a lithium-ion battery will be described as an example in the following embodiments, other chargeable/dischargeable secondary batteries such as a nickel hydrogen battery, a lead battery, an electric double layer capacitor, and a hybrid capacitor can also be used. Furthermore, while an assembled battery is constructed by coupling a plurality of single cells in series in the following embodiments, an assembled battery may be constructed by coupling a plurality of single cells in parallel to form a group and subsequently coupling a plurality of such groups in series or an assembled battery may be constructed by coupling a plurality of single cells in series to form a group and subsequently coupling a plurality of such groups in parallel.

First Embodiment

Figure 1:
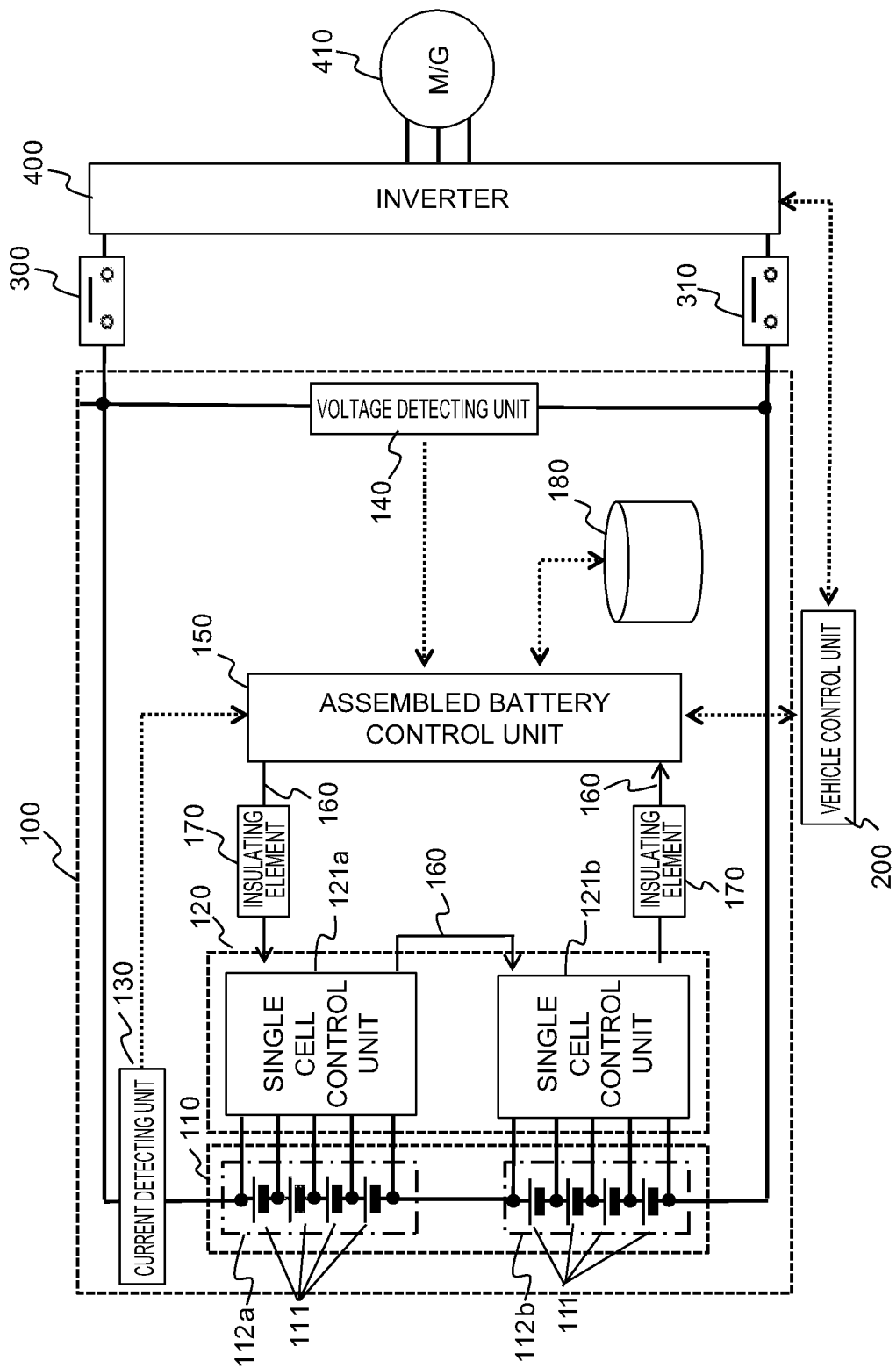
FIG. 1 is a diagram showing a configuration of a battery system and a periphery thereof according to an embodiment of the present invention.

FIG. 1 is a diagram showing a configuration of a battery system 100 and a periphery thereof according to an embodiment of the present invention. The battery system 100 is coupled to an inverter 400 via relays 300 and 310. The battery system 100 includes an assembled battery 110, a single cell managing unit 120, a current detecting unit 130, a voltage detecting unit 140, an assembled battery control unit 150, and a storage unit 180.

The assembled battery 110 is constituted of a plurality of single cells 111. The single cell managing unit 120 monitors a state of the single cells 111. The current detecting unit 130 detects a current flowing through the battery system 100. The voltage detecting unit 140 detects a total voltage of the assembled battery 110. The assembled battery control unit 150 detects a state of the assembled battery 110, manages the state, and the like.

The assembled battery 110 is constructed by electrically coupling, in series, a plurality of single cells 111 capable of storing and discharging electric energy (charging and discharging direct-current power). For example, a lithium-ion battery with an output voltage of 3.0 to 4.2 V (average output voltage: 3.6 V) is used as each single cell 111. Alternatively, the single cells 111 may be defined by other voltage specifications. The single cells 111 that constitute the assembled battery 110 are divided into groups, each containing a predetermined number of single cells 111, for performing management and control of a state of the single cells 111. The grouped single cells 111 are electrically coupled in series and constitute single cell groups 112a and 112b. The number of single cells 111 that constitute the single cell groups 112 may be the same for all single cell groups 112 or the number of single cells 111 may differ from one single cell group 112 to the next.

The single cell managing unit 120 monitors a state of the single cells 111 that constitute the assembled battery 110. The single cell managing unit 120 includes single cell control units 121 that are provided for each single cell group 112. In FIG. 1, single cell control units 121a and 121b are provided so as to correspond to the single cell groups 112a and 112b. The single cell control unit 121 monitors and controls the state of the single cells 111 that constitute the single cell group 112.

In the present embodiment, for the sake of brevity, the assembled battery 110 including a total of eight single cells 111 is constructed by electrically coupling four single cells 111 in series to construct the single cell groups 112a and 112b and further electrically coupling the single cell groups 112a and 112b in series.

Measured values of a battery voltage and a temperature of the single cells 111 that are output from the single cell managing unit 120, a current value from the current detecting unit 130, a total voltage value of the assembled battery 110 that is output from the voltage detecting unit 140, battery characteristic information of the single cells 111 that is stored in the storage unit 180, and the like are input to the assembled battery control unit 150. In addition, the single cell managing unit 120 has a function of diagnosing whether or not the single cells 111 are over-charged or over-discharged and a function of outputting an abnormal signal when a communication error or the like occurs in the single cell managing unit 120, in which case a diagnostic result thereof and the abnormal signal are also input to the assembled battery control unit 150. Furthermore, signals from a vehicle control unit 200 that is a higher-order control apparatus are also input to the assembled battery control unit 150.

Based on input information and a current limit value and battery characteristics of the single cells 111 having been stored in the storage unit 180 in advance, the assembled battery control unit 150 performs calculations for appropriately controlling charge/discharge of the assembled battery 110. For example, the assembled battery control unit 150 executes calculations of limit values of charged/discharged power with respect to each single cell 111, calculations of a State Of Charge (SOC) and a State Of Health based on Resistance (SOHR) of each single cell 111, calculations for performing voltage equalization control of each single cell 111, and the like. The assembled battery control unit 150 outputs calculation results thereof and commands based on the calculation results to the single cell managing unit 120 and the vehicle control unit 200.

The storage unit 180 stores information related to battery characteristics of the assembled battery 110, the single cells 111, and the single cell groups 112. While the storage unit 180 is configured to be installed outside the assembled battery control unit 150 or the single cell managing unit 120 in the present embodiment, alternatively, the assembled battery control unit 150 or the single cell managing unit 120 may be configured to include a storage unit and the information described above may be stored therein.

The assembled battery control unit 150 and the single cell managing unit 120 transmit and receive signals via an insulating element 170, typified by a photocoupler, and signal communication means 160. The insulating element 170 is provided because the assembled battery control unit 150 and the single cell managing unit 120 have different operating power supplies. Specifically, while the single cell managing unit 120 operates by receiving power from the assembled battery 110, the assembled battery control unit 150 uses a battery (for example, a 14 V-series battery) for in-vehicle auxiliaries as a power supply. The insulating element 170 may be mounted to a circuit board that constitutes the single cell managing unit 120 or a circuit board that constitutes the assembled battery control unit 150. Depending on system configuration, the insulating element 170 can also be omitted.

Communication means between the assembled battery control unit 150 and the single cell control units 121*a* and 121*b* that constitute the single cell managing unit 120 will be described. The single cell control units 121*a* and 121*b* are coupled in series according to a descending order of potential of the single cell groups 112*a* and 112*b* that are being respectively monitored by the single cell control units 121*a* and 121*b*. A signal transmitted by the assembled battery control unit 150 to the single cell managing unit 120 is input to the single cell control unit 121*a* via the insulating element 170 and the signal communication means 160. An output of the single cell control unit 121*a* is input to the single cell control unit 121*b* via the signal communication means 160, and an output of the lowest-order single cell control unit 121*b* is transmitted to the assembled battery control unit 150 via the insulating element 170 and the signal communication means 160. While signals are not transmitted and received via the insulating element 170 between the single cell control unit 121*a* and the single cell control unit 121*b* in the present embodiment, alternatively, signals can be transmitted and received between the single cell control unit 121*a* and the single cell control unit 121*b* via the insulating element 170.

The vehicle control unit 200 controls the inverter 400 that is coupled to the battery system 100 via the relays 300 and 310 using information transmitted by the assembled battery control unit 150. During vehicle travel, the battery system 100 is coupled to the inverter 400 and uses energy stored in the assembled battery 110 to drive a motor generator 410.

When a vehicle system mounted with the battery system 100 is started up and travels, under management of the vehicle control unit 200, the battery system 100 is coupled to the inverter 400, uses energy stored in the assembled battery 110 to drive the motor generator 410 and, during regeneration, the assembled battery 110 is charged by generated power of the motor generator 410. Energy stored in the assembled battery 110 by the charge is not only used when the vehicle next travels but is also used to operate electrical components inside and outside the vehicle.

Figure 2:
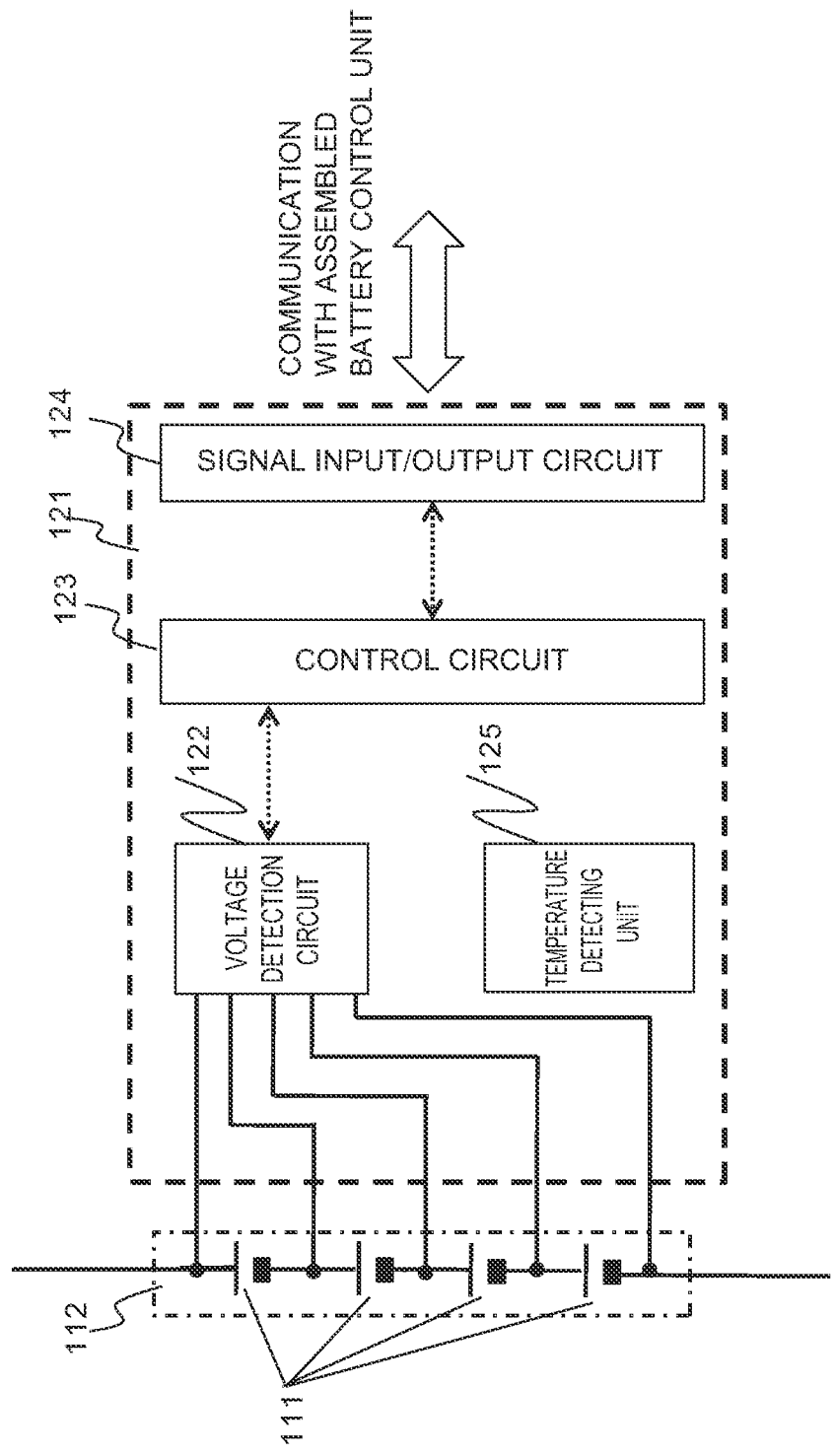
FIG. 2 is a diagram showing a circuit configuration of a single cell control unit.

FIG. 2 is a diagram showing a circuit configuration of the single cell control unit 121. The single cell control unit 121 includes a voltage detection circuit 122, a control circuit 123, a signal input/output circuit 124, and a temperature detecting unit 125. The voltage detection circuit 122 measures an inter-terminal voltage of each single cell 111. The control circuit 123 receives measurement results from the voltage detection circuit 122 and the temperature detecting unit 125 and transmits the measurement results to the assembled battery control unit 150 via the signal input/output circuit 124. A circuit configuration which is generally mounted to the single cell control unit 121 for equalizing variations in a voltage and an SOC between single cells 111 that are caused by variations in self-discharge and consumption current is considered well-known and a description thereof has been omitted.

The temperature detecting unit 125 included in the single cell control unit 121 shown in FIG. 2 has a function of measuring a temperature of the single cell group 112. The temperature detecting unit 125 measures a single temperature for the single cell group 112 as a whole and handles the temperature as a representative temperature value of the single cells 111 that constitute the single cell group 112. The temperature measured by the temperature detecting unit 125 is used for various calculations for detecting states of the single cells 111, the single cell groups 112, or the assembled battery 110. Based on this premise, FIG. 2 shows the single cell control unit 121 provided with a single temperature detecting unit 125. While each single cell 111 can be provided with the temperature detecting unit 125 to measure a temperature for each single cell 111 and various calculations can be executed based on the temperature of each single cell 111, in this case, the increased number of temperature detecting units 125 makes the configuration of the single cell control unit 121 complicated.

FIG. 2 shows the temperature detecting unit 125 in a simplified manner. In reality, a temperature sensor is installed in a temperature measurement object, the installed temperature sensor outputs temperature information as a voltage, a result of a measurement of the voltage is transmitted to the signal input/output circuit 124 via the control circuit 123, and the signal input/output circuit 124 outputs the measurement result to outside of the single cell control unit 121. A function of realizing this flow can be mounted to the single cell control unit 121 as the temperature detecting unit 125, in which case the voltage detection circuit 122 can be used to measure temperature information (voltage).

Figure 3:
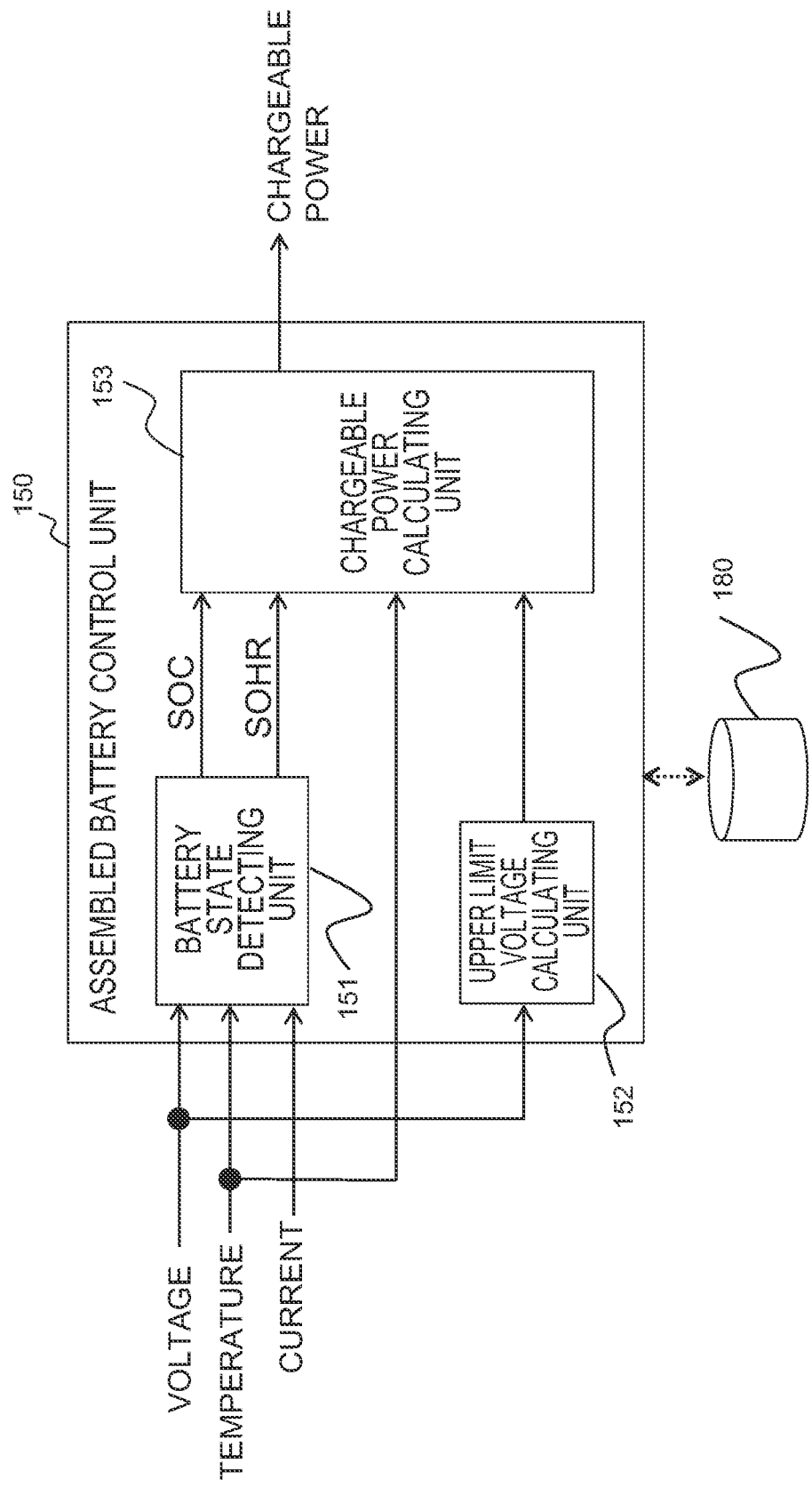
FIG. 3 is a diagram showing a functional configuration of an assembled battery control unit according to a first embodiment of the present invention.

FIG. 3 is a diagram showing a functional configuration of the assembled battery control unit 150 according to the first embodiment of the present invention. The assembled battery control unit 150 is a portion that determines a state of each single cell 111 and power that can be input to and output from each single cell 111 in the assembled battery 110 based on a current value and a voltage value of each single cell 111 having been detected during vehicle travel and, as a functional component thereof, the assembled battery control unit 150 has a function of performing a calculation of chargeable power (charged power limit value) for limiting charged power of each single cell 111. FIG. 3 shows a functional configuration of the assembled battery control unit 150 related to the calculation of chargeable power. The functional configuration is a portion that assumes a function corresponding to the battery control apparatus according to the embodiment of the present invention. While the assembled battery control unit 150 has various functions necessary for controlling the assembled battery 110 such as a function of performing discharge control of each single cell 111 and a function of performing voltage equalization control of each single cell 111 in addition to the function of calculating chargeable power, since these are well-known functions and are not directly relevant to the present invention, detailed descriptions thereof will be hereinafter omitted.

As shown in FIG. 3, as functions thereof, the assembled battery control unit 150 has respective functional blocks of a battery state detecting unit 151, an upper limit voltage calculating unit 152, and a chargeable power calculating unit 153. Using these functional blocks, the assembled battery control unit 150 calculates the chargeable power of each single cell 111 based on a current of the assembled battery 110 detected by the current detecting unit 130 and a voltage and a temperature of the assembled battery 110 detected by the voltage detecting unit 140.

While a description of the assembled battery control unit 150 calculating the chargeable power of the assembled battery 110 has been given above, alternatively, chargeable power may be collectively calculated for a plurality of single cells 111. For example, chargeable power may be calculated for each of the single cell groups 112a and 112b or calculated based on a voltage of each single cell 111 that is detected by the single cell control unit 120. Even in such cases, chargeable power can be calculated by processing similar to that performed in the case of the assembled battery 110. In addition, the chargeable power of each single cell 111 can be calculated by similar processing. Therefore, hereinafter, the function of calculating chargeable power in the assembled battery control unit 150 will be described by simply referring to an object of calculation of chargeable power as a "battery".

The battery state detecting unit 151 calculates an SOC and an SOHR of the battery based on information related to a current, a voltage, and a temperature of the battery that is input to the assembled battery control unit 150. A method of calculating an SOC and an SOHR are presumed to be well-known and, accordingly, a description thereof will be omitted.

The upper limit voltage calculating unit 152 receives time series data of the voltage of the battery as input and calculates a voltage history of the battery based on the time series data. In addition, based on the voltage history of the battery, the upper limit voltage calculating unit 152 calculates and outputs an upper limit voltage of the battery during charge. A specific method of calculating the upper limit voltage by the upper limit voltage calculating unit 152 will be described later.

The chargeable power calculating unit 153 calculates and outputs chargeable power of the battery based on the SOC and SOHR of the battery that are calculated by the battery state detecting unit 151, the temperature of the battery that is input to the assembled battery control unit 150, and the upper limit voltage of the battery that is calculated by the upper limit voltage calculating unit 152. A method of calculating chargeable power will be described later.

Next, a specific method of calculating the upper limit voltage by the upper limit voltage calculating unit 152 will be described with reference to FIGS. 4 to 7.

Figure 4:
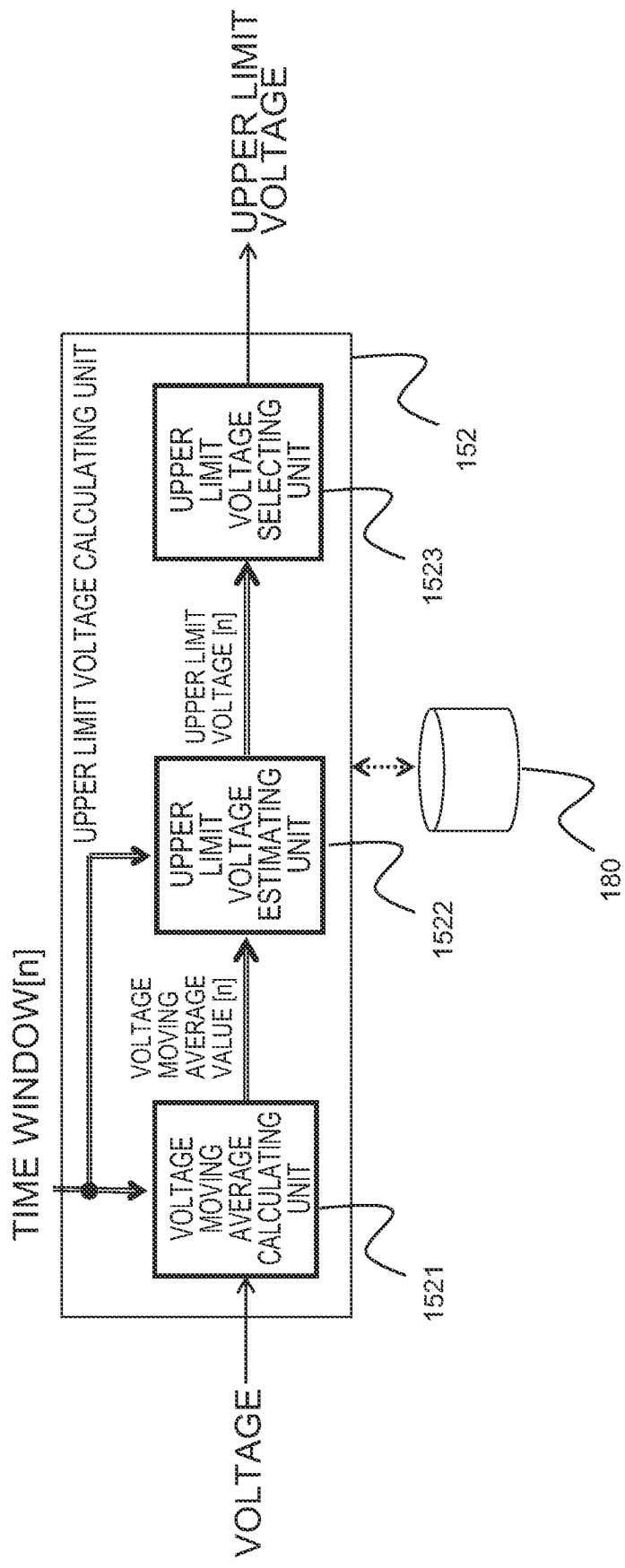
FIG. 4 is a control block diagram of an upper limit voltage calculating unit according to the first embodiment of the present invention.

FIG. 4 is a control block diagram of the upper limit voltage calculating unit 152 according to the first embodiment of the present invention. In the present embodiment, the upper limit voltage calculating unit 152 is constituted by a voltage moving average calculating unit 1521, an upper limit voltage estimating unit 1522, and an upper limit voltage selecting unit 1523.

The voltage moving average calculating unit 1521 receives time series data of the voltage of the battery as input and calculates a voltage moving average value as a voltage history of the battery by averaging the time series data by a predetermined time width. In this case, a single time window or a plurality of time windows with different time widths are set, and by calculating a moving average value of the time series data for each of the time windows, a voltage moving average value that corresponds to each time width is calculated. Subsequently, the calculation result of each obtained voltage moving average value is output to the upper limit voltage estimating unit 1522. In the example shown in FIG. 4, a voltage moving average value is respectively calculated with respect to n-number (where n is any natural number) of time windows and the obtained n-number of voltage moving average values are output to the upper limit voltage estimating unit 1522.

The upper limit voltage estimating unit 1522 estimates an upper limit voltage of the battery based on the voltage moving average values calculated by the voltage moving average calculating unit 1521. In this case, n-number of upper limit voltages are estimated by respectively estimating an upper limit voltage with respect to the n-number of voltage moving average values calculated by the voltage moving average calculating unit 1521.

The upper limit voltage selecting unit 1523 selects an upper limit voltage to be finally applied from the n-number of upper limit voltages having been estimated for each time width by the upper limit voltage estimating unit 1522. In this case, for example, a smallest upper limit voltage among the n-number of upper limit voltages is selected as a final upper limit voltage.

Figure 5:
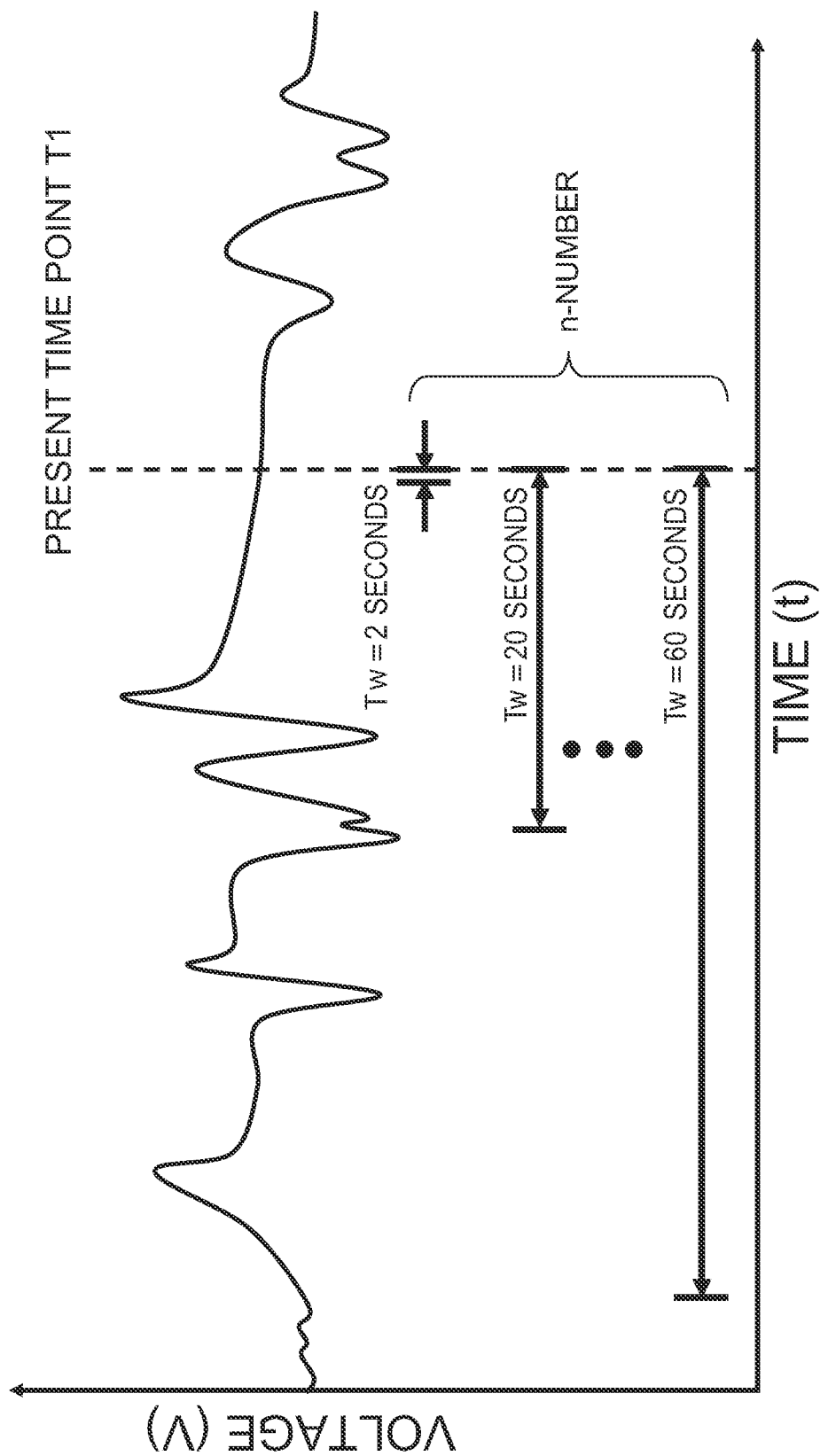
FIG. 5 is an explanatory diagram of a calculation method of a voltage moving average value.

FIG. 5 is an explanatory diagram of a calculation method of a voltage moving average value in the voltage moving average calculating unit 1521. In FIG. 5, with an abscissa representing time and an ordinate representing voltage, an example of time series data of a battery voltage that is input to the voltage moving average calculating unit 1521 is indicated by a voltage waveform.

As shown in FIG. 5, with a present time of day T1 as a reference, the voltage moving average calculating unit 1521 sets n-number of time windows with time widths Tw that differ from each other with respect to time series data of the battery voltage obtained up to the time of day T1. In addition, by averaging respective voltage values of the pieces of time series data included in each of the n-number of set time windows within the time window, a voltage history is calculated for each time window.

Specifically, for example, by calculating a simple moving average of each voltage value represented by time series data for each time window, the voltage moving average calculating unit 1521 averages the time series data and calculates a voltage history. For example, in the case of time series data of a battery voltage detected by setting a sampling period Ts to 0.1 seconds, a time window with a time width Tw of 2 seconds contains data of 20 voltage values, a time window with a time width Tw of 20 seconds contains data of 200 voltage values, and a time window with a time width Tw of 60 seconds contains data of 600 voltage values in the time series data. Therefore, simple moving averages as a voltage history corresponding to these time windows can be respectively calculated by mathematical expression (1) below. In mathematical expression (1), Vk represents data of a k-th sampled voltage value within a relevant time window in the time series data.

[Math. 1]

$$Vave(Tw = 2sec) = \frac{1}{20}\sum_{k=1}^{20} Vk$$

$$Vave(Tw = 20sec) = \frac{1}{200}\sum_{k=1}^{200} Vk$$

$$\vdots$$

$$Vave(Tw = 60sec) = \frac{1}{600}\sum_{k=1}^{600} Vk$$

Mathematical expression (1)

Alternatively, the voltage moving average calculating unit 1521 may average time series data and calculate a voltage history by applying a primary delay filter based on a predetermined time constant and calculating, for each time window, an exponential moving average of each piece of voltage value data that is included in the time series data. For example, in the case of time series data of the battery voltage that is detected by setting the sampling period Ts to 0.1 seconds as described above, as a voltage history corresponding to each of the time windows (filter time constants) with time widths Tw of 2 seconds, 20 seconds, and 60 seconds, exponential moving averages subjected to weighted-averaging in accordance with these filter time constants can be respectively calculated according to mathematical expression (2) below. In mathematical expression (2), V represents a present voltage value or, in other words, data of a latest voltage value in the time series data. In addition, Vave_z represents a previous voltage history calculated for each time width Tw or, in other words, a value of an exponential moving average calculated by weighted-averaging for each filter time constant during previous processing.

[Math. 2]

Mathematical expression (2)

$$Vave(Tw = 2sec) = Vave\_z(Tw = 2sec) + \frac{1}{20}(V - Vave\_z(Tw = 2sec))$$

$$Vave(Tw = 20sec) =$$

$$Vave\_z(Tw = 20sec) + \frac{1}{200}(V - Vave\_z(Tw = 20sec))$$

$$\vdots$$

$$Vave(Tw = 60sec) =$$

$$Vave\_z(Tw = 60sec) + \frac{1}{600}(V - Vave\_z(Tw = 60sec))$$

Due to the processing described above, the voltage moving average calculating unit 1521 is capable of setting one or a plurality of time windows with respect to time series data of a voltage of a battery and calculating a voltage moving average value as a voltage history that corresponds to each time window. While an example of calculating a simple moving average and an exponential moving average as the voltage moving average value has been described above, another arbitrary moving average may be calculated instead.

Using an upper limit voltage map stored in the storage unit 180 in advance, the upper limit voltage estimating unit 1522 estimates an upper limit voltage that corresponds to a voltage moving average value for each time width as calculated by the voltage moving average calculating unit 1521. The upper limit voltage map used in the present embodiment is set for each time width in advance. For example, with respect to a simple moving average calculated by mathematical expression (1) above or an exponential moving average calculated by mathematical expression (2) above, upper limit voltage maps corresponding to respective time windows of which the time widths Tw are 2 seconds, 20 seconds, and 60 seconds are stored in the storage unit 180 in advance. Using these upper limit voltage maps, the upper limit voltage estimating unit 1522 can respectively estimate an upper limit voltage that corresponds to a voltage moving average value for each time width.

Processing by the upper limit voltage estimating unit 1522 is represented by mathematical expression (3) below. In mathematical expression (3), 2secVmaxMap, 20secVmaxMap, and 60secVmaxMap represent upper limit voltage maps respectively corresponding to time windows of which the time widths Tw are 2 seconds, 20 seconds, and 60 seconds.

[Math. 3]

Mathematical expression (3)

$$Vmax(Tw = 2sec) = 2secVmaxMap((Vave(Tw = 2sec))$$

$$Vmax(Tw = 20sec) = 20secVmaxMap((Vave(Tw = 20sec))$$

$$\vdots$$

$$Vmax(Tw = 60sec) =$$

$$60secVmaxMap((Vave(Tw = 60sec))$$

While an example of an upper limit voltage with respect to a simple moving average and an exponential moving average respectively calculated in mathematical expressions (1) and (2) has been explained with respect to mathematical expression (3), an upper limit voltage can be estimated for each time width with respect to other moving averages in a similar manner.

The upper limit voltage selecting unit 1523 selects an upper limit voltage to be utilized for battery control from the upper limit voltages having been estimated for each time width according to mathematical expression (3) by the upper limit voltage estimating unit 1522. In the present embodiment, for example, a smallest value among a plurality of upper limit voltages is selected as a final upper limit voltage value according to mathematical expression (4) below.

[Math. 4]

$$Vmax=Min(Vmax(Tw=2 \text{ sec}), Vmax(Tw=20 \text{ sec}), \ldots Vmax(Tw=60 \text{ sec}))$$

Mathematical expression(4)

Next, an upper limit voltage map which is stored in the storage unit 180 and which is referred to by the upper limit voltage estimating unit 1522 will be described. In the present embodiment, the upper limit voltage map is created based on a result of a charge/discharge test performed in advance using a battery. For example, a cycling test that assumes charge/discharge cycles in which a battery voltage that is reached during charge or a voltage sojourn time (a time during which the battery voltage stays at a certain voltage) is varied is performed as a charge/discharge test of the battery. An upper limit voltage map is constructed based on a result of the cycling test.

When constructing an upper limit voltage map from a cycling test result, whether or not deposition of lithium metal occurs in a lithium-ion battery must be determined. As an index used when making the determination, for example, a capacity retention rate or a resistance increase rate of the battery can be used. The capacity retention rate is a ratio of a present (after degradation) battery capacity to a battery capacity when the battery is brand new, and the capacity retention rate decreases as the battery degrades. On the other hand, the resistance increase rate is a ratio of a present (after degradation) internal resistance to an internal resistance when the battery is brand new, and the resistance increase rate increases as the battery degrades.

FIGS. 6A-6C are diagrams showing an example of a cycling test result according to the first embodiment of the present invention. FIGS. 6A-6C show a result of performing a cycling test in which charge and discharge of a battery are repeated while respectively varying voltage during charge and voltage sojourn time. FIG. 6A represents an example of a case where the voltage sojourn time is long, FIG. 6B represents an example of a case where the voltage sojourn time is intermediate, and FIG. 6C represents an example of a case where the voltage sojourn time is short. By plotting the number of cycles on an abscissa and a capacity retention rate on an ordinate, the diagrams show a relationship between the number of cycles and a capacity retention rate of the battery.

All of FIGS. 6A to 6C demonstrate that, while capacity hardly changes with respect to the number of cycles when the voltage is low, the capacity tends to drop significantly as the number of cycles increases when the voltage is intermediate or high. It is also shown that the longer the voltage sojourn time, the larger the drop width of the capacity. Under such conditions where capacity drops significantly, it is speculated that a degradation of capacity in accordance with deposition of lithium metal on an electrode has occurred instead of a so-called normal degradation. Therefore, in an upper limit voltage map, an upper limit voltage that enables battery use under such test conditions to be avoided is preferably set.

It should be noted that an evaluation related to the presence or absence of deposition of lithium metal is not limited to a method based on a capacity retention rate as described above and the evaluation may be performed using other methods. For example, a determination may be made based on a resistance increase rate instead of a capacity retention rate as described above. Alternatively, the battery may be disassembled, in which case whether or not lithium metal is deposited on an electrode surface may be evaluated using an analysis method such as NMR (Nuclear Magnetic Resonance). Based on such a test result, a voltage value at which lithium metal is not deposited is extracted for each voltage sojourn time to create an upper limit voltage map. For example, on the upper limit voltage map, a low voltage value is set in the case where the voltage sojourn time is long as shown in FIG. 6A, an intermediate voltage value is set in the case where the voltage sojourn time is intermediate as shown in FIG. 6B, and a high voltage value is set in the case where the voltage sojourn time is short as shown in FIG. 6C.

Figures 7A, 7B:
FIGS. 7A and 7B are diagrams showing an outline of an upper limit voltage map according to the first embodiment of the present invention.

FIGS. 7A and 7B are diagrams showing an outline of an upper limit voltage map according to the first embodiment of the present invention. FIGS. 7A and 7B show an outline of an upper limit voltage map which is created from the cycling test result shown in FIGS. 6A-6C and which is mounted to the storage unit 180. FIG. 7A represents an example of an upper limit voltage map when a filter time constant (time window) is relatively long and FIG. 7B represents an example of an upper limit voltage map when the filter time constant (time window) is relatively long. As shown in the diagrams, a high value is set as the upper limit voltage when the voltage moving average value is small. The upper limit voltage map is set such that, the higher the voltage moving average value, the smaller the value of the upper limit voltage. The upper limit voltage is varied so that, once the voltage moving average value exceeds a given threshold Vth1, the upper limit voltage starts to drop, and when the voltage moving average value finally reaches another threshold Vth2, the upper limit voltage matches an upper limit voltage in each filter time constant (time window).

Next, the chargeable power calculating unit 153 that constitutes the assembled battery control unit 150 will be described with reference to FIG. 8.

Figure 8:
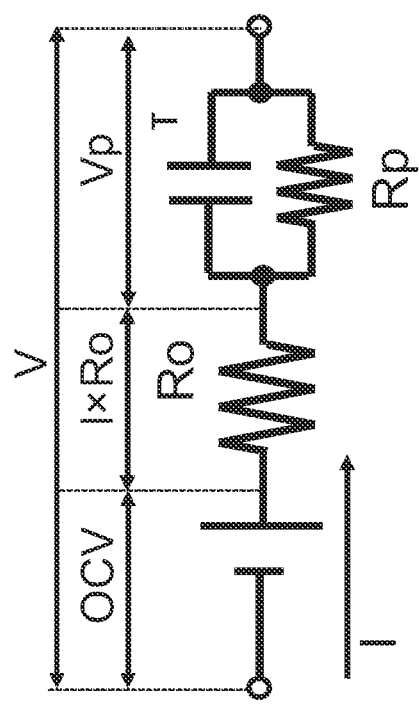
FIG. 8 is a diagram showing an equivalent circuit model for reproducing voltage behavior of a battery.

FIG. 8 is a diagram showing an equivalent circuit model for reproducing voltage behavior of a battery. In FIG. 8, OCV denotes an open circuit voltage of a battery, Ro denotes an ohmic resistance of members and the like of the battery, Rp denotes an internal resistance (polarization resistance) that indicates an amount of loss accompanying an electrochemical reaction or a diffusion of lithium ions, τ denotes a time constant of polarization, and Vp denotes a polarization voltage. These equivalent circuit parameters are to be extracted by an experiment or a simulation in advance in accordance with an SOC or a temperature and stored in the storage unit 180. In the present embodiment, the chargeable power calculating unit 153 is configured to calculate chargeable power on the assumption of the equivalent circuit model shown in FIG. 8.

The chargeable power calculating unit 153 receives the upper limit voltage determined by the upper limit voltage calculating unit 152, the state of charge (SOC) and the rate of increase of internal resistance (SOHR) calculated by the battery state detecting unit 151, and the battery temperature detected by the temperature detecting unit 125 as input, and calculates and outputs chargeable power of the assembled battery 110. In this case, the chargeable power is calculated as a product of a chargeable current that can be passed through the battery during charge and a voltage of the battery when the chargeable current is conducted. The chargeable current can be calculated as whichever is the smaller current value of a current value that can be passed until the voltage of the battery reaches the upper limit voltage and a current limit value that is determined by constituent members (relays, fuses, and the like) that constitute the battery system 100.

A current value that can be passed until the voltage of the battery reaches the upper limit voltage can be calculated according to mathematical expression (5) below as a current value when a battery voltage V calculated using the equivalent circuit model shown in FIG. 8 is equal to an upper limit voltage value Vmax that is calculated by mathematical expression (4).

[Math. 5]

$$I_{chg} = \frac{V\max - (OCV(SOC, T) + Vp)}{Ro(SOC, T) \times \frac{SOHR}{100}}$$

Mathematical expression (5)

According to mathematical expression (6) below, whichever is smaller of a current value Ichg calculated by mathematical expression (5) above and a current limit value Ilimit that is determined by constituent members of the battery system 100 and the like is selected as a chargeable current Imax,chg. It should be noted that the current limit value Ilimit may be a value determined in advance or the current limit value Ilimit may be changed in accordance with a temperature of the battery or the like.

[Math. 6]

$$I_{max,chg} = \min(I_{chg}, Ilimit) \quad \text{Mathematical expression (6)}$$

Chargeable power is calculated according to mathematical expression (7) below from the chargeable current Imax, chg calculated by mathematical expression (6) above. In mathematical expression (7), N denotes the number of single cells 111 that constitute the assembled battery 110. In addition, a term subsequent to OCV(SOC,T) on the right side of mathematical expression (7) corresponds to a mathematical expression for calculating a battery voltage when the chargeable current is conducted. This represents a battery voltage when the chargeable current Imax,chg is conducted in the equivalent circuit model of the battery shown in FIG. 8.

[Math. 7]

Mathematical expression (7)
$$W_{chg} = N \times I_{maxchg} \times \left( OCV(SOC, T) + I_{maxchg} \times B_o(SOC, T) \times \frac{SOHR}{100} + V_p \right)$$

Generally, since internal resistance of a battery is small at room temperature or a higher temperature, the current value Ichg that is calculated based on mathematical expression (5) described earlier takes an extremely large value. As a result, in mathematical expression (6), the current limit value Ilimit that is determined by constituent members or the like of battery system 100 is often adopted as the chargeable current Imax,chg. On the other hand, at low temperatures or after degradation at which the internal resistance of the battery increases, the current value Ichg falls below the current limit value Ilimit. Therefore, in mathematical expression (6), the current value Ichg is more often adopted as the chargeable current Imax,chg and, consequently, a chargeable current and chargeable power become heavily dependent on the upper limit voltage value Vmax that is calculated by mathematical expression (4).

While an example in which the chargeable power calculating unit 153 calculates both a chargeable current and chargeable power has been described above, only one may be calculated instead. In other words, the chargeable power calculating unit 153 may only calculate a chargeable current and not calculate chargeable power.

Figure 9:
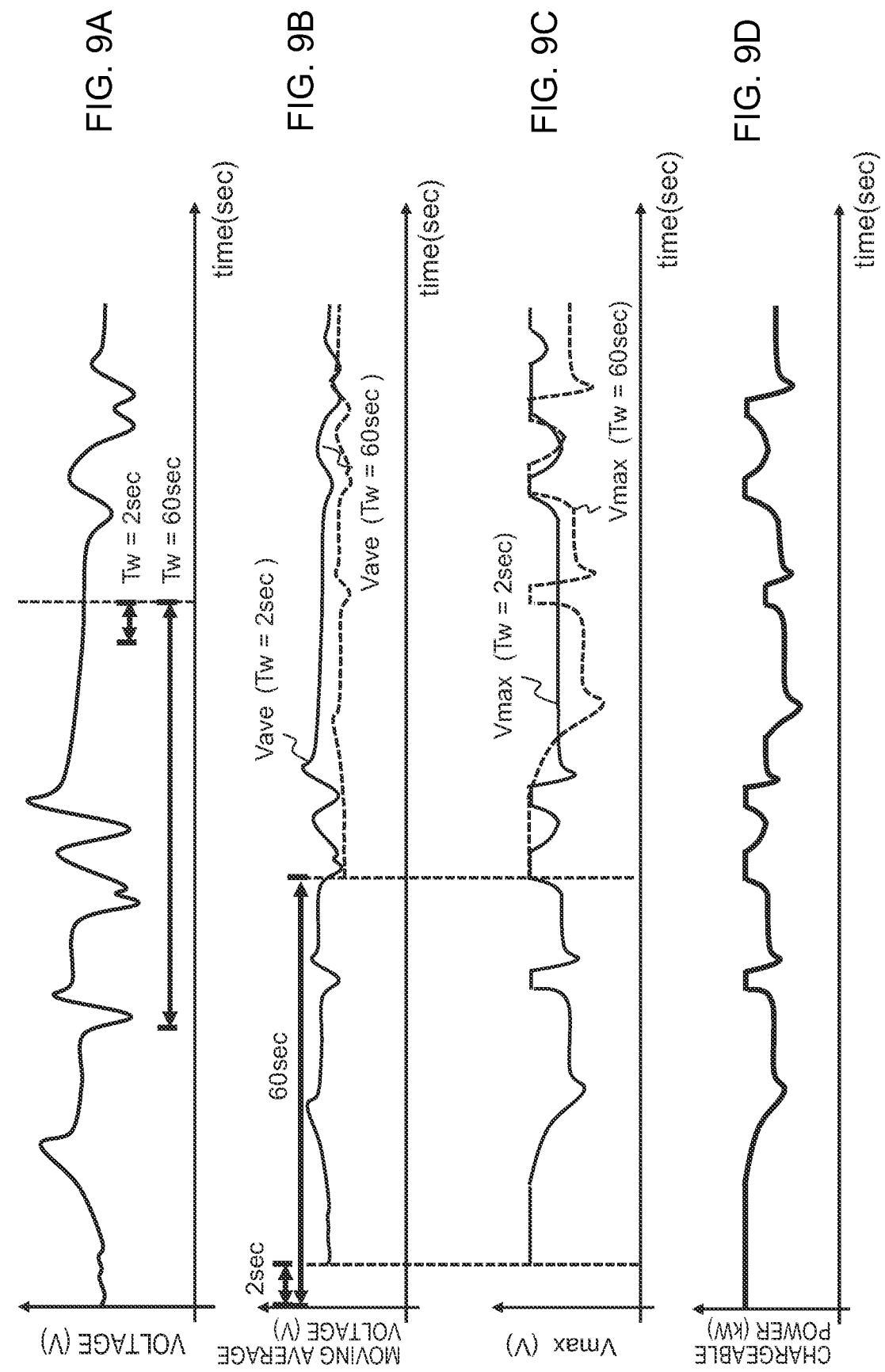
FIGS. 9A-D are diagrams for explaining an effect of applying the present invention to calculate chargeable power of a battery.

An effect of applying the present invention to calculate chargeable power of a battery will be described below with reference to FIGS. 9A-9D. FIGS. 9A-9D show an example of time series data of a voltage when a battery is charged and discharged at a given temperature and an example of a voltage history, an upper limit voltage, and chargeable power that are calculated by the assembled battery control unit 150 based on the time series data. FIG. 9A indicates time series data of a voltage, FIG. 9B indicates a moving average voltage that represents a voltage history, FIG. 9C indicates an upper limit voltage, and FIG. 9D indicates chargeable power.

When a vehicle mounted with the battery system 100 travels in a given travel pattern, the single cell control unit 121 acquires time series data of a voltage such as that shown in FIG. 9A. In the assembled battery control unit 150, with respect to a voltage waveform shown in FIG. 9A, for example, the upper limit voltage calculating unit 152 sets two time windows respectively with time widths Tw of 2 seconds and 60 seconds and calculates a moving average based on mathematical expression (1) or mathematical expression (2) described earlier. Accordingly, moving average voltages resembling voltage waveforms shown in FIG. 9B are obtained as respective voltage histories. It should be noted that, in FIG. 9B, a solid line indicates the moving average voltage of which a time width is 2 seconds and a dashed line indicates the moving average voltage of which a time width is 60 seconds.

The upper limit voltage calculating unit 152 estimates an upper limit voltage that corresponds to each moving average voltage shown in FIG. 9B based on mathematical expression (3) described earlier. Accordingly, upper limit voltages resembling voltage waveforms shown in FIG. 9C are obtained as respective moving average voltages. It should be noted that, in FIG. 9C, a solid line indicates the upper limit voltage corresponding to the moving average voltage of which a time width is 2 seconds and a dashed line indicates the upper limit voltage corresponding to the moving average voltage of which a time width is 60 seconds.

Furthermore, based on mathematical expression (4) described earlier, the upper limit voltage calculating unit 152 compares the respective upper limit voltages shown in FIG. 9C for each predetermined calculation period and selects whichever is smaller, and adopts the selected upper limit voltage as a final upper limit voltage with respect to the battery. In addition, the upper limit voltage calculating unit 152 calculates chargeable power that corresponds to the final upper limit voltage based on mathematical expressions (5) to (7) described earlier. Accordingly, chargeable power resembling a voltage waveform shown in FIG. 9D is obtained with respect to each upper limit voltage shown in FIG. 9C.

A comparison between FIG. 9B and FIG. 9C shows that, when the moving average voltage is considered to be high or, in other words, when a voltage sojourn time (retention time) in a high voltage area is considered to be long, the final upper limit voltage is set to a low value. Conversely, when the moving average voltage is considered to be low or, in other words, when a voltage sojourn time (retention time) in a high voltage area is considered to be short, the final upper limit voltage is set to a high value. As a result, the chargeable power is limited as shown in FIG. 9D. Accordingly, it is shown that a sojourn (retention) in a high voltage area where there is a concern of lithium metal deposition can be avoided and, at the same time, battery use at high power is permitted when the voltage sojourn time in the high voltage area is short.

As described above, with the assembled battery control unit 150 according to the present embodiment, maximum chargeable power can be extracted while suppressing deposition of lithium metal on an electrode surface of a secondary battery.

The first embodiment of the present invention described above produces the following operational advantages.

(1) The assembled battery control unit 150 determines an upper limit voltage during charge of the single cell 111 or the assembled battery 110 that are secondary batteries and calculates chargeable power of the batteries based on the upper limit voltage. The assembled battery control unit 150 includes the upper limit voltage calculating unit 152 which calculates a voltage history of a battery based on time series data of a voltage of the battery and which calculates the upper limit voltage based on the voltage history. Accordingly, an appropriate upper limit voltage can be set to enable maximum charging performance of the secondary battery to be exhibited while effectively suppressing degradation of the secondary battery.

(2) In the upper limit voltage calculating unit 152, the voltage moving average calculating unit 1521 calculates a voltage history by averaging time series data of a voltage of the battery by a predetermined time width. Accordingly, a voltage history necessary for calculating the upper limit voltage can be appropriately obtained from the time series data of the voltage of the battery.

(3) In the upper limit voltage calculating unit 152, the voltage moving average calculating unit 1521 calculates, as a voltage history, a simple moving average of each voltage corresponding to a predetermined time width in time series data of a voltage of the battery or an exponential moving average obtained by weighted-averaging each voltage in accordance with a time constant. Accordingly, the time series data of the voltage of the battery can be appropriately averaged in accordance with a time width to be used as a voltage history.

(4) The upper limit voltage calculating unit 152 uses the voltage moving average calculating unit 1521 to calculate a plurality of voltage histories by respectively calculating a voltage history with respect to a plurality of time windows with different time widths, and uses the upper limit voltage estimating unit 1522 to set a smallest upper limit voltage among the plurality of upper limit voltages calculated by the upper limit voltage estimating unit 1522 based on the plurality of voltage histories as an upper limit voltage of the battery. Accordingly, an optimal upper limit voltage can be set in consideration of a voltage sojourn time.

(5) The assembled battery control unit 150 includes the chargeable power calculating unit 153 which calculates a chargeable current or chargeable power of the battery based on the upper limit voltage determined by the upper limit voltage calculating unit 152. Accordingly, a chargeable current or chargeable power in accordance with the upper limit voltage can be determined and used for charge control of the battery.

Second Embodiment

Next, a second embodiment of the present invention will be described. Since the presence or absence of deposition of metal lithium is also largely dependent on a temperature of a battery, in the present embodiment, an example will be described in which an upper limit voltage is calculated by taking the temperature of a battery into consideration in addition to a voltage history of the battery. It should be noted that a configuration of a battery system according to the present embodiment is similar to that of the battery system 100 shown in FIG. 1 and described in the first embodiment with the exception of the battery system having an assembled battery control unit 150a in place of the assembled battery control unit 150. Hereinafter, contents of the present embodiment will be described with a focus on differences between the assembled battery control units 150 and 150a.

Figure 10:
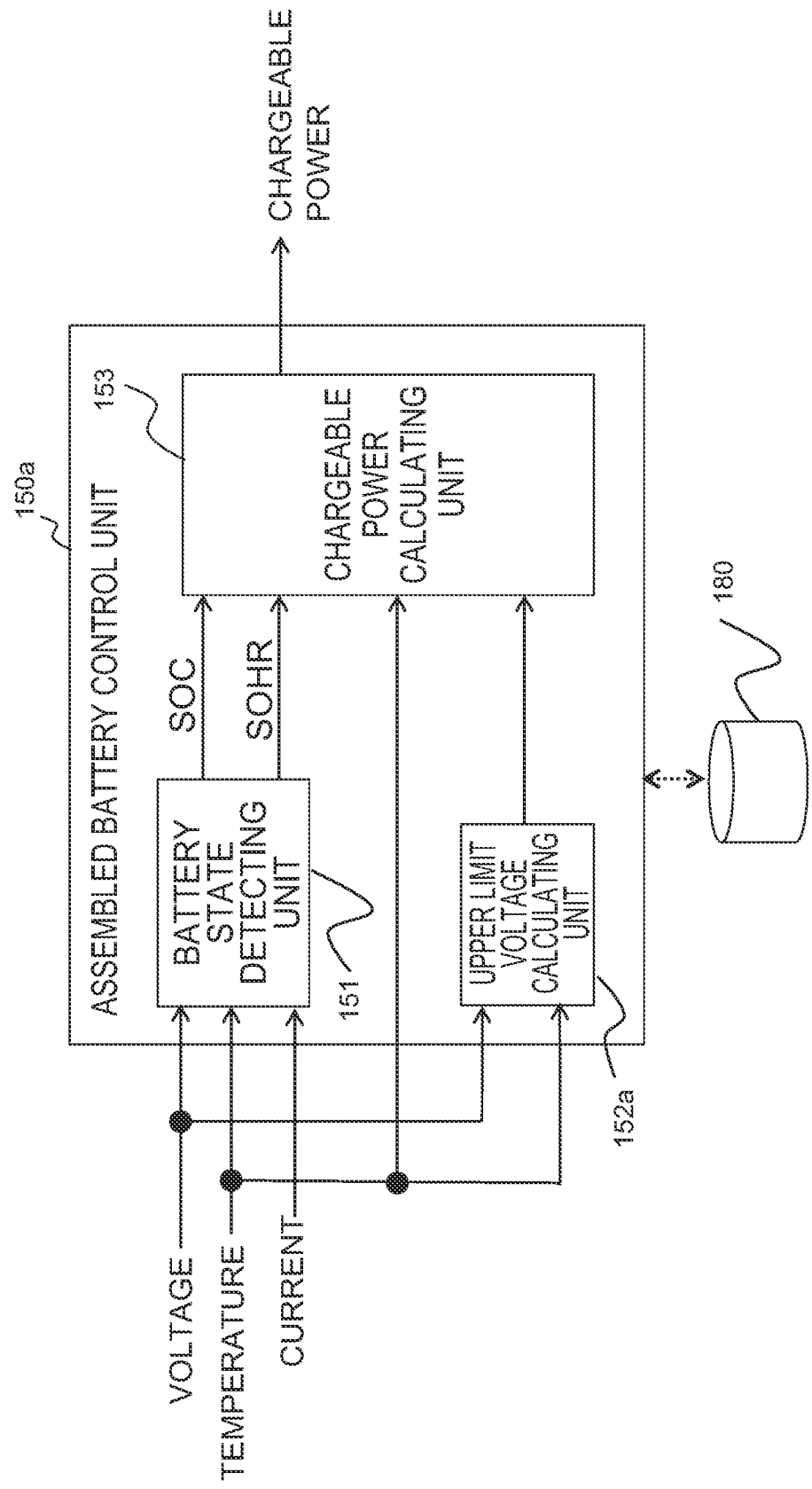
FIG. 10 is a diagram showing a functional configuration of an assembled battery control unit according to a second embodiment of the present invention.

FIG. 10 is a diagram showing a functional configuration of the assembled battery control unit 150a according to the second embodiment of the present invention. The assembled battery control unit 150a according to the present embodiment has a similar functional configuration to the assembled battery control unit 150 according to the first embodiment with the exception of having an upper limit voltage calculating unit 152a in place of the upper limit voltage calculating unit 152 shown in FIG. 3 and a voltage and a temperature of a battery having been acquired by the assembled battery control unit 150 being input to the upper limit voltage calculating unit 152a.

The upper limit voltage calculating unit 152a receives time series data of the voltage of the battery as input and calculates a voltage history of the battery based on the time series data in a similar manner to the upper limit voltage calculating unit 152 according to the first embodiment. In addition, based on the voltage history and a temperature of the battery, the upper limit voltage calculating unit 152a calculates and outputs an upper limit voltage of the battery during charge.

Figure 11:
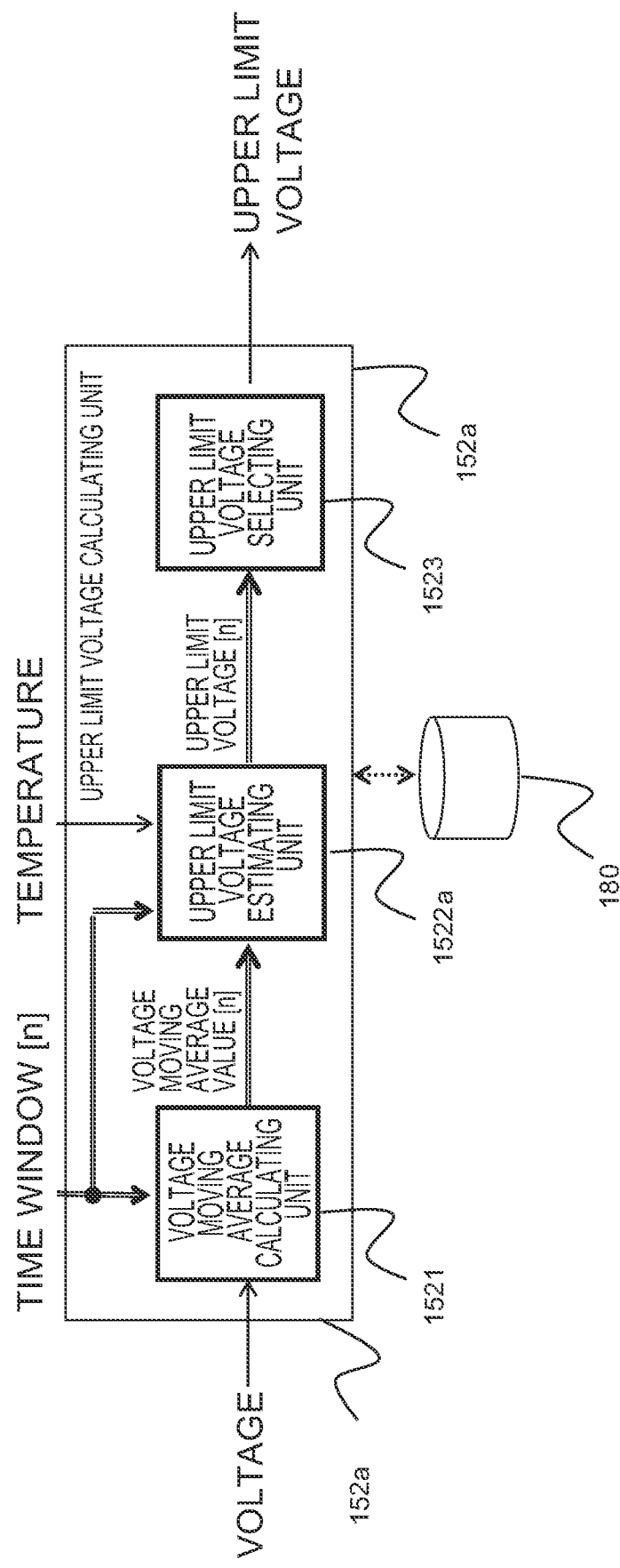
FIG. 11 is a control block diagram of an upper limit voltage calculating unit according to the second embodiment of the present invention.

FIG. 11 is a control block diagram of the upper limit voltage calculating unit 152a according to the second embodiment of the present invention. The upper limit voltage calculating unit 152a according to the present embodiment has a similar functional configuration to the upper limit voltage calculating unit 152 according to the first embodiment with the exception of having an upper limit voltage estimating unit 1522a in place of the upper limit voltage estimating unit 1522 shown in FIG. 4 and a temperature of a battery having been calculated by the battery state detecting unit 151 being input to the upper limit voltage estimating unit 1522a.

The upper limit voltage estimating unit 1522a estimates an upper limit voltage of the battery based on the voltage moving average values calculated by the voltage moving average calculating unit 1521 in a similar manner to the upper limit voltage estimating unit 1522 according to the first embodiment. In this case, based on n-number of voltage moving average values for each time width calculated by the voltage moving average calculating unit 1521 and the temperature of the battery input to the upper limit voltage calculating unit 152a from the single cell managing unit 120, the upper limit voltage estimating unit 1522a refers to an upper limit voltage map having been stored in the storage unit 180 in advance and estimates an upper limit voltage with respect to each of the n-number of voltage moving average values.

The upper limit voltage map used in the present embodiment is set to each combination of a time width and a temperature in advance and is created based on a result of a charge/discharge test performed in advance using the battery. For example, a cycling test that assumes charge/discharge cycles in which a battery voltage that is reached during charge, a voltage sojourn time, and a battery temperature are varied is performed as a charge/discharge test of the battery. An upper limit voltage map is constructed based on a result of the cycling test.

Figures 12A, 12B, 12C:
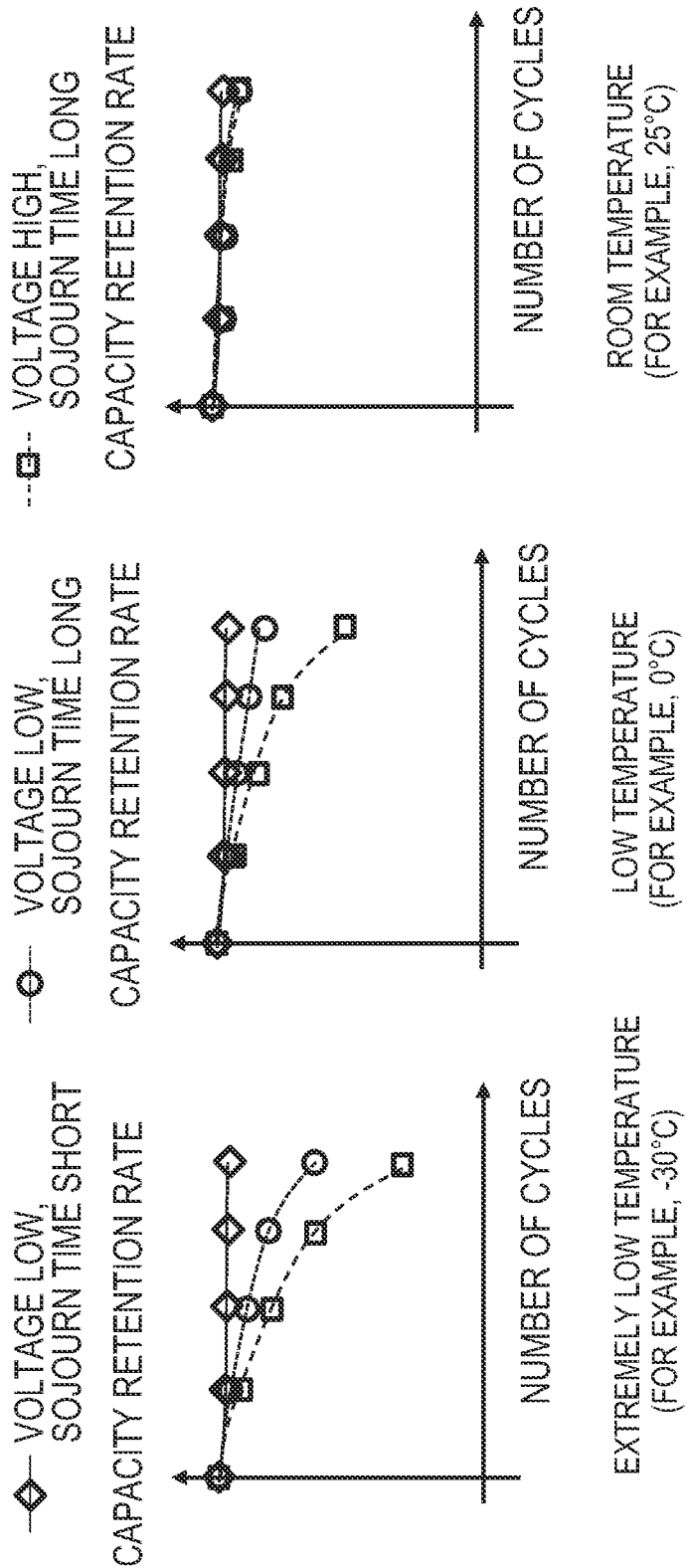
FIGS. 12A-C are diagrams showing an example of a cycling test result according to the second embodiment of the present invention.

FIGS. 12A-C are diagrams showing an example of a cycling test result according to the second embodiment of the present invention. FIGS. 12A-C show a result of respectively performing, at different temperatures, a cycling test in which charge and discharge of a battery are repeated while varying a combination of a voltage during charge and a voltage sojourn time. FIG. 12A represents an example of an extremely low temperature (for example, −30° C.), FIG. 12B represents an example of a low temperature (for example, 0° C.), and FIG. 12C represents an example of a room temperature (for example, 25° C.). By plotting the number of cycles on an abscissa and a capacity retention rate on an ordinate, the diagrams show a relationship between the number of cycles and a capacity retention rate of the battery.

All of FIGS. 12A to 12C demonstrate that, while capacity hardly changes with respect to the number of cycles when the voltage is low and the voltage sojourn time is short, the capacity tends to drop significantly as the number of cycles increases when the voltage is low and the voltage sojourn time is long or when the voltage is high and the voltage sojourn time is long. It is also shown that, in this case, the lower the battery temperature, the larger the drop width of the capacity. Under such conditions where capacity drops significantly, it is speculated that a degradation of capacity in accordance with deposition of lithium metal on an electrode has occurred instead of a so-called normal degradation. Therefore, in an upper limit voltage map, an upper limit voltage that enables battery use under such test conditions to be avoided is preferably set.

FIGS. 13A and 13B are diagrams showing an outline of an upper limit voltage map according to the second embodiment of the present invention. FIGS. 13A and 13B show an outline of an upper limit voltage map which is created from the cycling test result shown in FIGS. 12A-12C and which is mounted to the storage unit 180. FIG. 13A represents an example of an upper limit voltage map when a filter time constant (time window) is relatively long and FIG. 13B represents an example of an upper limit voltage map when the filter time constant (time window) is relatively short. As shown in the diagrams, the upper limit voltage map is set such that, the upper limit voltage is set to a high value when the voltage moving average value is small, and the higher the voltage moving average value, the smaller the value of the upper limit voltage. In addition, the lower the temperature, the smaller the value of the upper limit voltage as a whole. In consideration of this trend, an upper limit voltage in accordance with the voltage moving average value is appropriately set by an experiment and a simulation or the like so as not to deviate from the upper limit voltage obtained from the experiment result.

According to the second embodiment of the present invention described above, the upper limit voltage calculating unit 152a determines an upper limit voltage based on a voltage history and a temperature of a battery. Accordingly, an even more appropriate upper limit voltage can be set in consideration of the temperature of the battery. As a result, a charge performance of the battery can be fully utilized while preventing deposition of lithium metal even when a battery temperature changes.

Third Embodiment

Next, a third embodiment of the present invention will be described. Since the presence or absence of deposition of lithium metal is also largely dependent on a current value during charge, in the present embodiment, an example will be described in which an upper limit voltage is calculated by taking a current that flows through a battery into consideration in addition to a voltage history and a temperature of the battery. It should be noted that a configuration of a battery system according to the present embodiment is similar to that of the battery system 100 shown in FIG. 1 and described in the first and second embodiments with the exception of the battery system having an assembled battery control unit 150b in place of the assembled battery control unit 150. Hereinafter, contents of the present embodiment will be described with a focus on differences between the assembled battery control units 150 and 150a.

Figure 14:
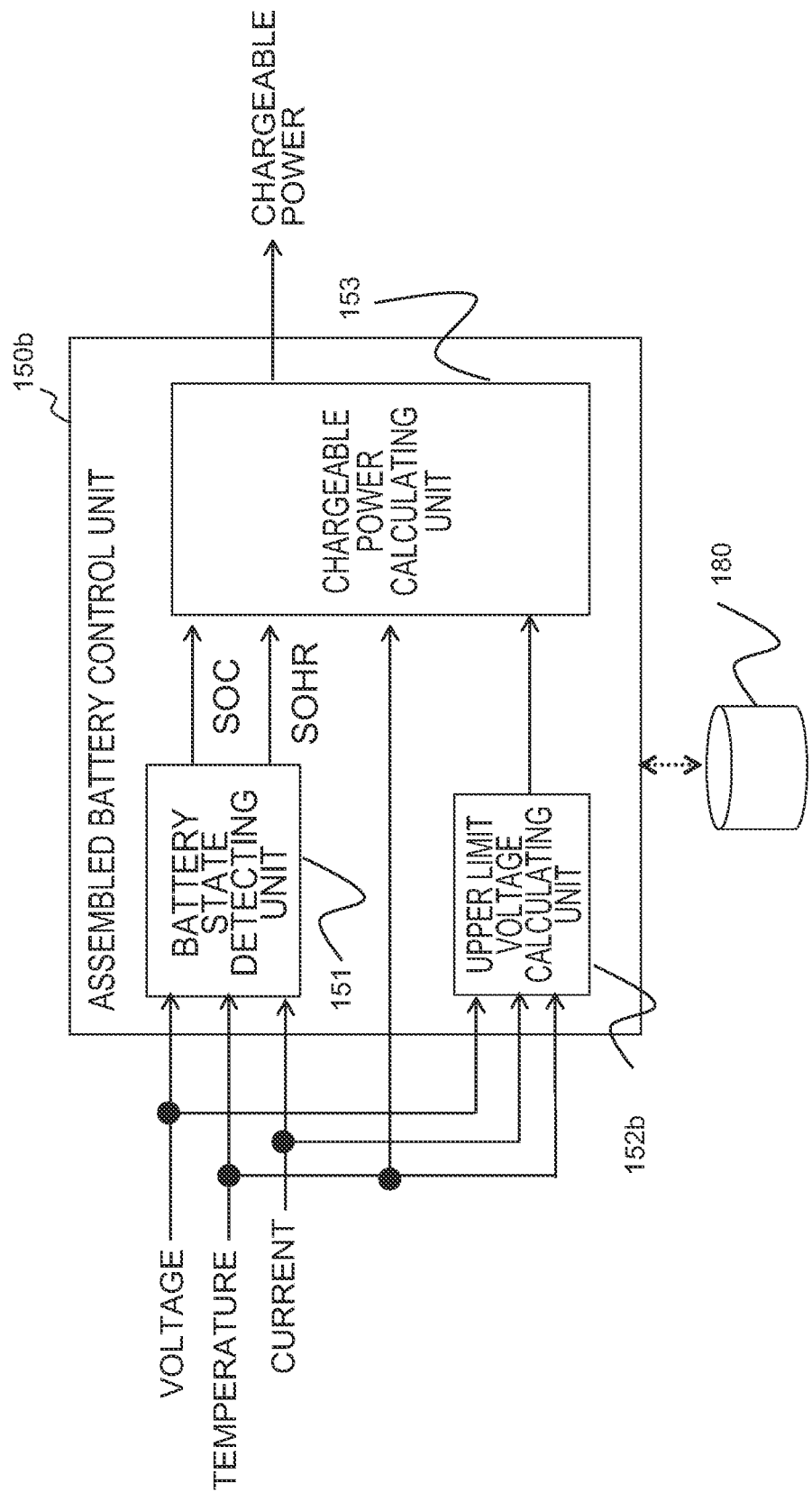
FIG. 14 is a diagram showing a functional configuration of an assembled battery control unit according to a third embodiment of the present invention.

FIG. 14 is a diagram showing a functional configuration of the assembled battery control unit 150b according to the third embodiment of the present invention. The assembled battery control unit 150b according to the present embodiment has a similar functional configuration to the assembled battery control unit 150 according to the first embodiment with the exception of a current having been added as an input to the upper limit voltage calculating unit 152b.

FIG. 14 is a diagram showing a functional configuration of the assembled battery control unit 150b according to the third embodiment of the present invention. The assembled battery control unit 150b according to the present embodiment has a similar functional configuration to the assembled battery control unit 150 according to the first embodiment with the exception of having an upper limit voltage calculating unit 152b in place of the upper limit voltage calculating unit 152 shown in FIG. 3 and a current value that flows through a battery being input to the upper limit voltage calculating unit 152b in addition to a voltage and a temperature of the battery having been acquired by the assembled battery control unit 150.

The upper limit voltage calculating unit 152b receives time series data of a voltage of the battery as input and calculates a voltage history of the battery based on the time series data in a similar manner to the upper limit voltage calculating unit 152 according to the first embodiment. In addition, based on the voltage history, a current, and a temperature of the battery, the upper limit voltage calculating unit 152b calculates and outputs an upper limit voltage of the battery.

Figure 15:
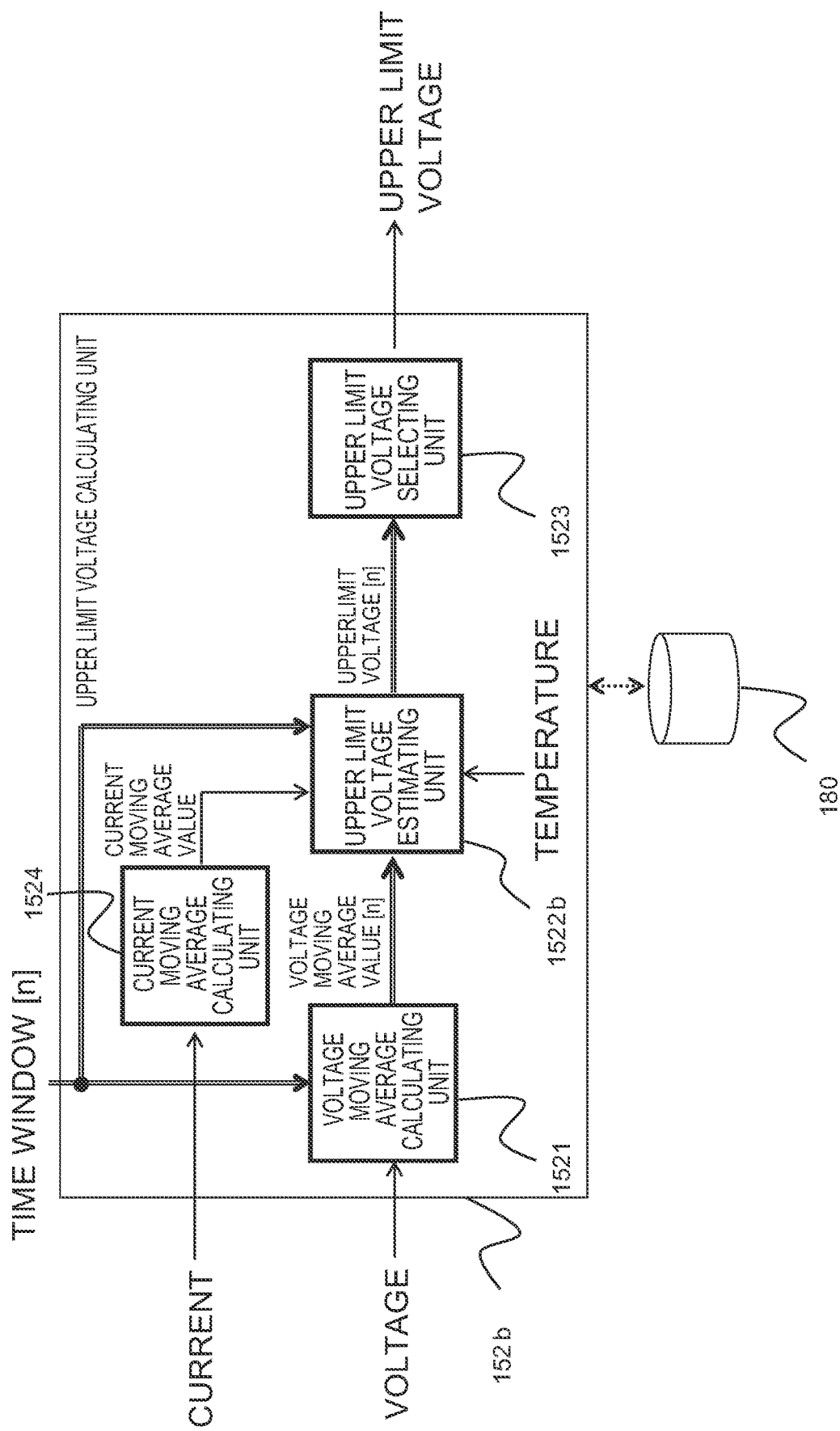
FIG. 15 is a control block diagram of an upper limit voltage calculating unit according to the third embodiment of the present invention.

FIG. 15 is a control block diagram of the upper limit voltage calculating unit 152b according to the third embodiment of the present invention. In addition to having an upper limit voltage estimating unit 1522b in place of the upper limit voltage estimating unit 1522 shown in FIG. 4, the upper limit voltage calculating unit 152b according to the present embodiment further has a current moving average calculating unit 1524 based on a current value that flows through the battery. The upper limit voltage calculating unit 152b has a similar functional configuration to the upper limit voltage calculating unit 152 according to the first embodiment with the exception of a temperature of a battery having been acquired by the assembled battery control unit 150 and a current moving average value having been calculated by the current moving average calculating unit 1524 being input to the upper limit voltage estimating unit 1522b.

The upper limit voltage estimating unit 1522b estimates an upper limit voltage of the battery based on the voltage moving average values calculated by the voltage moving average calculating unit 1521 in a similar manner to the upper limit voltage estimating unit 1522 according to the first embodiment. In this case, based on n-number of voltage moving average values for each time width calculated by the voltage moving average calculating unit 1521, the temperature of the battery input to the upper limit voltage calculating unit 152a from the single cell managing unit 120, and the current moving average value calculated by the current moving average calculating unit 1524, the upper limit voltage estimating unit 1522b refers to an upper limit voltage map stored in the storage unit 180 in advance and estimates an upper limit voltage with respect to each of the n-number of voltage moving average values.

The current moving average calculating unit 1524 is calculated according to mathematical expression (8) or mathematical expression (9) below based on a current value. Tw included in mathematical expression (8) or mathematical expression (9) denotes a filter time constant (time window) for current moving average calculation. As the filter for current moving average calculation, for example, a value similar to the filter time constant (time window) for voltage moving average calculation may be set. Alternatively, in consideration of the fact that lithium ion concentration on an electrode/electrolyte interface affects deposition of metal lithium, on the premise that a change in lithium ion concentration (diffusion) on the electrode/electrolyte interface is a linear diffusion, a value that enables behavior of the diffusion to be reproduced may be set.

[Math. 8]

Mathematical expresssion (8)
$$Iave(Tw) = Iave\_z(Tw) + \frac{1}{10 \times Tw}(I - Iave\_z(Tw))$$

[Math. 9]

Mathematical expression (9)
$$Iave(Tw) = \frac{1}{10 \times Tw}\sum_{k=1}^{10 \times Tw} Ik$$

In the mathematical expressions, Iave denotes a current moving average value and Iave z denotes a previous value of the current moving average value.

The upper limit voltage map used in the present embodiment is set to each combination of a time width, a temperature, and a current moving average value in advance and is created based on a result of a charge/discharge test performed in advance using a battery. For example, a cycling test that assumes charge/discharge cycles in which a battery voltage that is reached during charge, a voltage sojourn time, a battery temperature, and a charge current value are varied is performed as a charge/discharge test of the battery. An upper limit voltage map is constructed based on a result of the cycling test.

FIGS. 16A and 16B are diagrams showing an example of a cycling test result according to the third embodiment of the present invention. FIGS. 16A and 16B show a result of respectively performing, while varying a current value that is passed during charge, a cycling test in which charge and discharge of a battery are repeated while respectively varying a combination of a voltage during charge and voltage sojourn time. FIG. 16A represents a result example of a case where a test is performed using a large charge current value and FIG. 16B represents a result example of a case where a test is performed using a small charge current value. By plotting the number of cycles on an abscissa and a capacity retention rate on an ordinate, the diagrams show a relationship between the number of cycles and a capacity retention rate of the battery.

Both FIGS. 16A and 16B demonstrate that, while capacity hardly changes with respect to the number of cycles when the voltage is low and the voltage sojourn time is short, the capacity tends to drop significantly as the number of cycles increases when the voltage is low and the voltage sojourn time is long or when the voltage is high and the voltage sojourn time is long. It is also shown that, in this case, the larger the charge current that flows through the battery, the larger the drop width of the capacity. Under such conditions where capacity drops significantly, it is speculated that a degradation of capacity in accordance with deposition of lithium metal on an electrode has occurred instead of a so-called normal degradation. Although not described in FIGS. 16A and 16B, also adding battery temperature as a standard with respect to the present cycling test and analyzing data enables the presence or absence of deposition of metal lithium to be confirmed in accordance with all conditions including voltage, temperature, and current. In the upper limit voltage map, an upper limit voltage that enables battery use under conditions causing deposition of lithium metal to be avoided is preferably set.

Figure 17A:
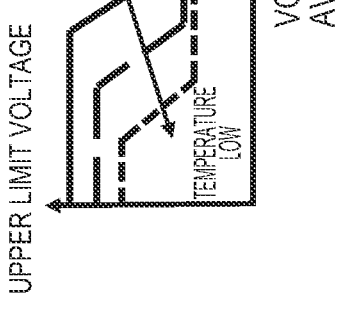
FIGS. 17A-D are diagrams showing an outline of an upper limit voltage map according to the third embodiment of the present invention.
Figure 17B:
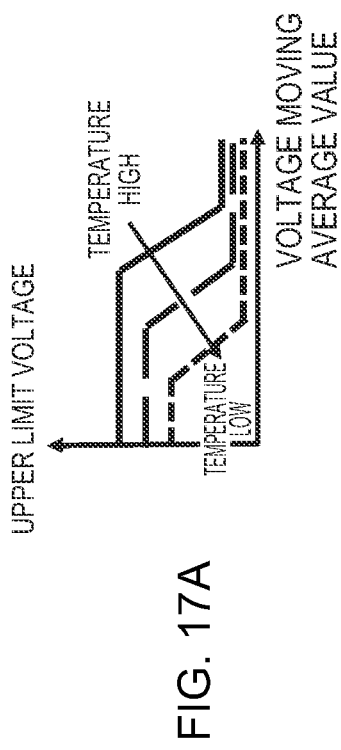
Figure 17C:
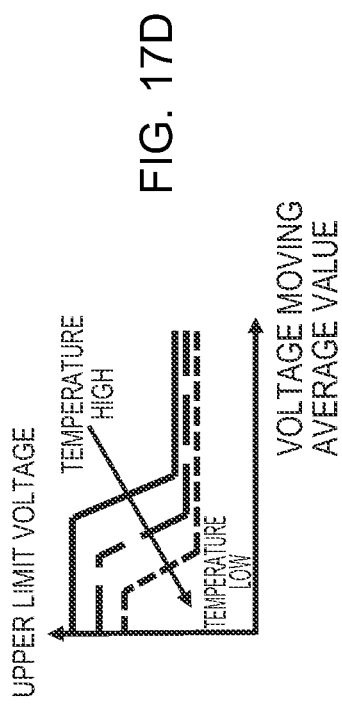
Figure 17D:
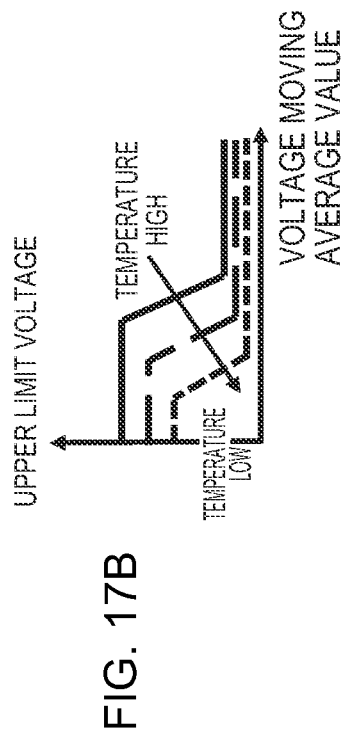

FIGS. 17A-D are diagrams showing an outline of an upper limit voltage map according to the third embodiment of the present invention. FIGS. 17A-D show an outline of an upper limit voltage map which is created from the cycling test result shown in FIGS. 16A and 16B and which is mounted to the storage unit 180. FIG. 17A represents an example of an upper limit voltage map when a filter time constant (time window) is relatively long and a current moving average value is small, FIG. 17B represents an example of an upper limit voltage map when a filter time constant (time window) is relatively short and a current moving average value is small, FIG. 17C represents an example of an upper limit voltage map when a filter time constant (time window) is relatively long and a current moving average value is large, and FIG. 17D represents an example of an upper limit voltage map when a filter time constant (time window) is relatively short and a current moving average value is large. As shown in the diagrams, the upper limit voltage map is set such that, the upper limit voltage is set to a high value when the voltage moving average value is small, and the higher the voltage moving average value, the smaller the value of the upper limit voltage. With respect to the current moving average value, an upper limit voltage is set such that the larger the current moving average value, the smaller the upper limit voltage. In addition, in a similar manner to the second embodiment, the lower the temperature, the smaller the value of the upper limit voltage as a whole. In consideration of this trend, an upper limit voltage in accordance with the voltage moving average value is appropriately set by an experiment and a simulation or the like so as not to deviate from the upper limit voltage obtained from the experiment result.

According to the third embodiment of the present invention described above, the upper limit voltage calculating unit 152b determines an upper limit voltage based on a voltage history and a temperature of a battery and a current value that flows through the battery. Accordingly, an even more appropriate upper limit voltage can be set in consideration of a current value (a current moving average value) of the battery. As a result, even when a current value during charge and discharge varies, a charge performance of a battery can be fully utilized while preventing deposition of lithium metal.

Fourth Embodiment

Next, a fourth embodiment of the present invention will be described. While an example reflecting the fact that the presence or absence of deposition of lithium metal is also largely dependent on a current value during charge has been described in the third embodiment, a simpler method of taking the dependence on a current value into consideration will be described in the present embodiment. It should be noted that a configuration of a battery system according to the present embodiment is similar to that of the battery system 100 shown in FIG. 1 and described in the first to third embodiments with the exception of the battery system having an upper limit voltage calculating unit 152c in place of the upper limit voltage calculating unit 152b in the assembled battery control unit 150b. Hereinafter, contents of the present embodiment will be described with a focus on differences from the upper limit voltage calculating unit 152b.

Figure 18:
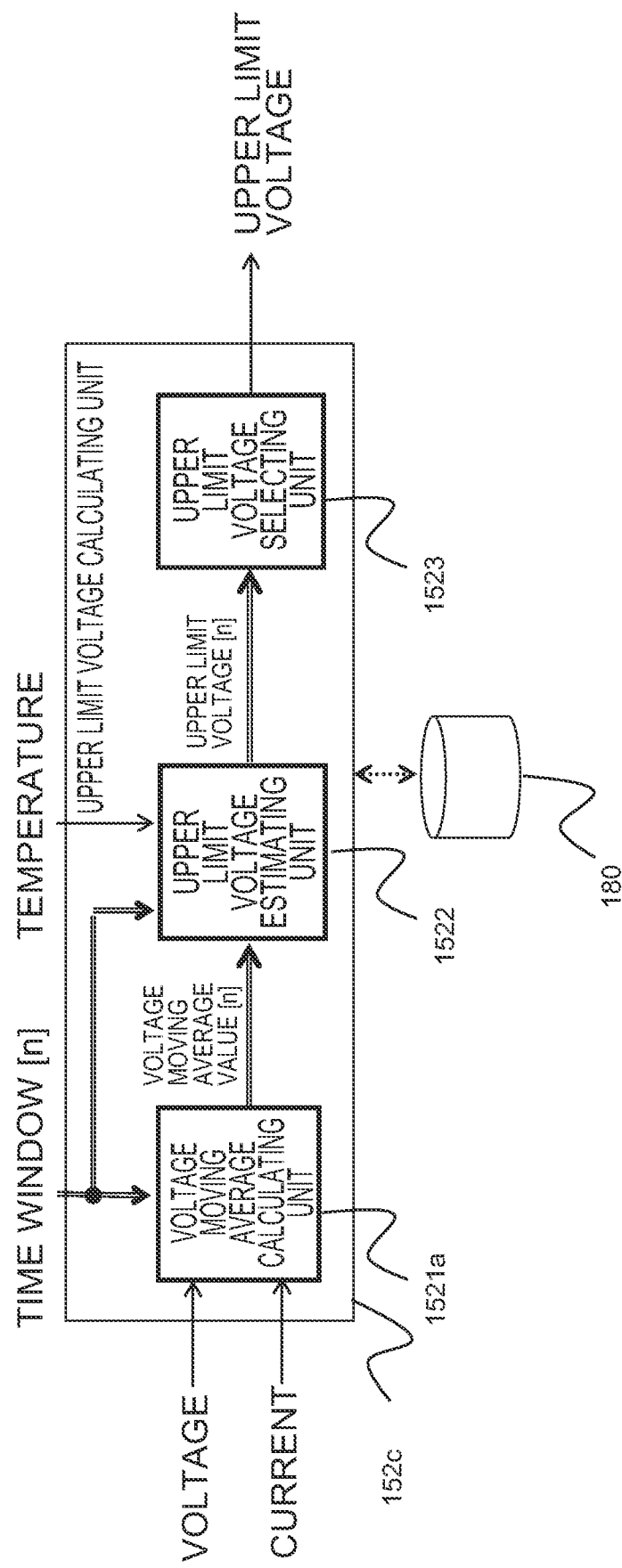
FIG. 18 is a control block diagram of an upper limit voltage calculating unit according to a fourth embodiment of the present invention.

FIG. 18 explains the upper limit voltage calculating unit 152c according to the fourth embodiment of the present invention. A difference from the upper limit voltage calculating unit 152*b* is that the current moving average value calculating unit 1524 has been deleted and a current moving average value to be input to the upper limit voltage estimating unit 1522*b* has been deleted but, instead, the upper limit voltage calculating unit 152*c* has a voltage moving average value calculating 1521*a* to which a current value is added as an input.

As also described in the explanation of the first to third embodiments, deposition of lithium metal differs according to a voltage of a battery and a current that flows through the battery. Deposition more readily occurs when the voltage is higher and the current value is larger. In consideration thereof, in the present embodiment, a weight coefficient in accordance with an acquired voltage value and an acquired current value is provided in the calculation of a voltage moving average. In other words, a weight is applied such that, when a newly acquired voltage value is a high value and a current value flowing at that point is large, a degree in which the acquired voltage value is reflected on averaging is increased.

Specific processing contents will be described based on mathematical expressions (10) to (14). Mathematical expression (10) represents an example of a case where a weight in accordance with a current and a voltage is applied to a simple moving average and is so-called weighted-averaging. Based on an acquired voltage value and a current value flowing at that point, a weight coefficient is calculated from a weight coefficient map (weightMap) determined in advance and normalized by a sum of all weight coefficients within a time window (mathematical expressions (11) and (12)). Using a result thereof, a voltage moving average value for each time window is calculated by weighted-averaging.

[Math. 10]

$$Vave(Tw = 2sec) = \sum_{k=1}^{20} wk(Ik, Vk, Tw) \times Vk$$

$$Vave(Tw = 20sec) = \sum_{k=1}^{200} wk(Ik, Vk, Tw) \times Vk$$

$$Vave(Tw = 60sec) = \sum_{k=1}^{600} wk(Ik, Vk, Tw) \times Vk$$

Mathematical expression (10)

[Math. 11]

$$wk(Ik, Vk, Tw) = \frac{weightMap(Ik, Vk)}{weightSum(Tw)}$$

Mathematical expression (11)

[Math. 12]

$$weightSum(Tw) = \sum_{k=1}^{Tw \times 10} weightMap(Ik, Vk)$$

Mathematical expression (12)

Mathematical expression (13) is a weighted-averaging formula in a case where an exponential moving average is applied to the calculation of a voltage moving average. Based on an acquired voltage value and a current value flowing at that point, a weight coefficient is calculated from a weight coefficient map (weightMap) determined in advance (mathematical expression (14)) to calculate a voltage moving average value for each time window.

[Math. 13]

$$Vave(Tw = 2sec) = \\ Vave\_z(Tw = 2sec) + \frac{weightMap(I, V)}{20}(V - Vave\_z(Tw = 2sec))$$

$$Vave(Tw = 2sec) = Vave\_z(Tw = 20sec) + \\ \frac{weightMap(I, V)}{200}(V - Vave\_z(Tw = 20sec))$$

$$\vdots$$

$$Vave(Tw = 60sec) = \\ Vave\_z(Tw = 60sec) + \frac{weightMap(I, V)}{600}(V - Vave\_z(Tw = 60sec))$$

Mathematical expression (13)

[Math. 14]

$$wk(I, V) = weightMap(I, V)$$

Mathematical expression (14)

FIG. 19 illustrates an example of weightMap described in mathematical expressions (12) and (14). weightMap is a map in accordance with a current and a voltage and, the higher the voltage value and the larger the current value (where a charge side is assumed to be positive), the larger the set weight coefficient. An upper limit voltage is estimated using the voltage moving average value calculated based on the mathematical expression (10) or (13) described above. Since the various calculations using the voltage moving average value are similar to the contents described in the first and second embodiments, a description thereof will be omitted. The map shown in FIG. 19 may be determined in consideration of current dependence of metal lithium deposition conditions having been introduced in the third embodiment.

According to the fourth embodiment of the present invention described above, the voltage moving average calculating unit 1521*a* can set a weight coefficient having been set based on a current and a voltage of a battery and calculate a voltage moving average value in consideration of an effect of a current value by moving average processing of a voltage that reflects the weight coefficient. Accordingly, by taking a current value of the battery into consideration and increasing a weight applied to a moving average calculation with respect to a voltage value when the current value is high, an upper limit voltage can be limited promptly even when a state where a current is high persists. As a result, even when a current and a voltage which are important factors in deposition of lithium metal vary, a charge performance of a battery can be fully utilized while preventing deposition of lithium metal.

Fifth Embodiment

Next, a fifth embodiment of the present invention will be described with reference to FIGS. 20 to 23. In the present embodiment, handing of a voltage during a vehicle system rest period that becomes an issue upon mounting to an electric motor vehicle system will be described. Since a battery voltage cannot be measured during a vehicle system rest period, a voltage moving average calculation such as that described in mathematical expressions (1) and (2) cannot be continued. Therefore, upon vehicle system start-up, a calculation logic for taking a change in voltage during the rest period into consideration and determining an initial value of a voltage history (a voltage moving average value) is required for each time constant. In consideration thereof, in the present embodiment, a method will be described of appropriately determining an initial value of the voltage moving average value upon a present start-up based on a vehicle rest time, a voltage moving average value and a voltage value upon end of a previous travel, and a voltage value upon the present start-up.

Figure 20:
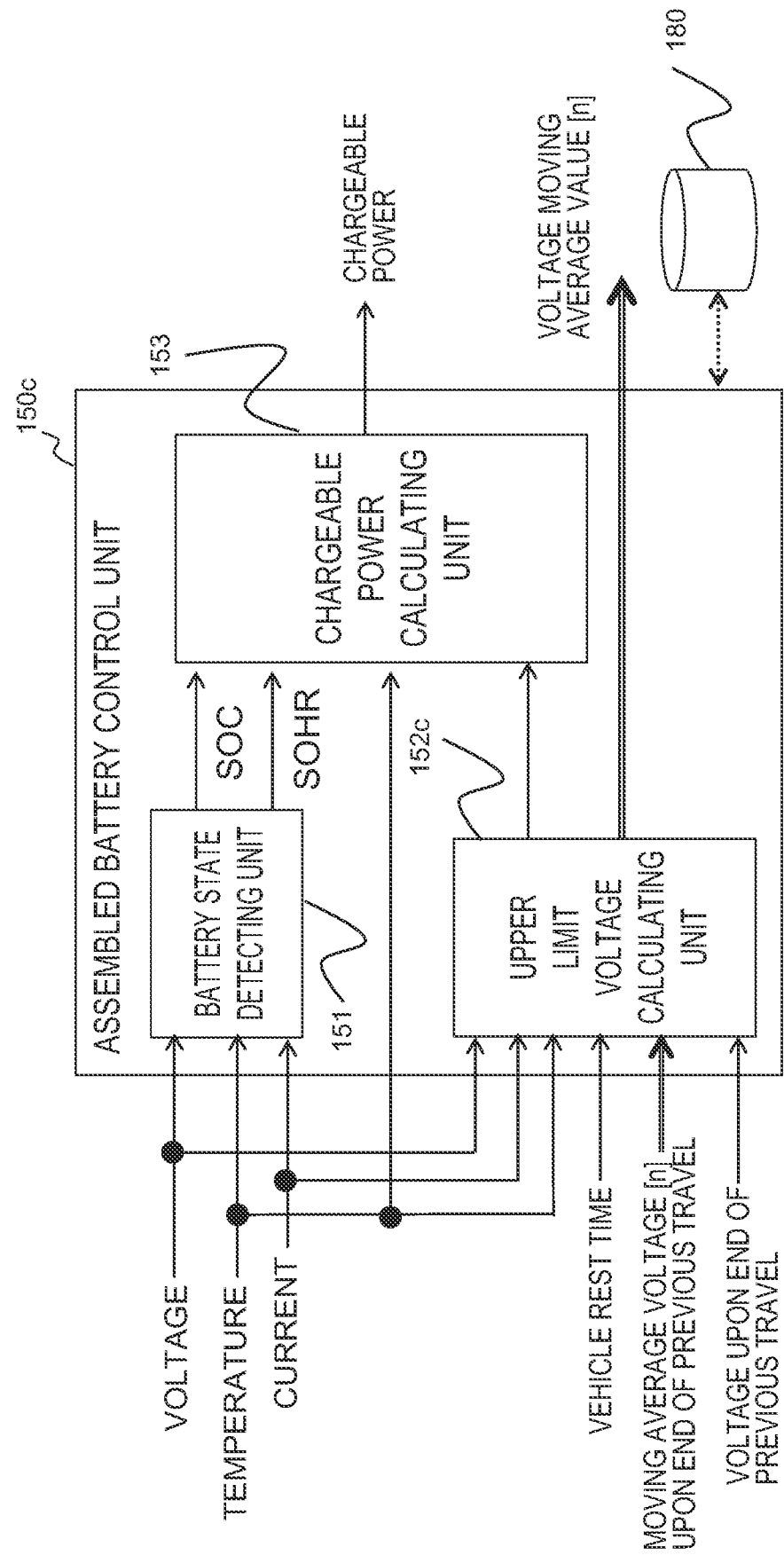
FIG. 20 is a diagram showing a functional configuration of an assembled battery control unit according to a fifth embodiment of the present invention.

FIG. 20 is a control block diagram of assembled battery control means 150c according to an embodiment of the present invention. A major difference from the first to fourth embodiments is that a vehicle rest time, a voltage upon end of a previous travel, and a moving average voltage upon the end of the previous travel are input and added to the upper limit voltage calculating unit 152c. It should be noted that, although not illustrated, a vehicle neglect time is measured using a device capable of measuring time such as an RTC (Real Time Clock). In addition, a configuration is assumed in which the voltage upon the end of the previous travel and the moving average voltage upon the end of the previous travel are stored in the storage unit 180 upon the end of the previous travel and read upon a next start-up. Otherwise, the configuration of the assembled battery control unit 150c is similar to that in the first to fourth embodiments.

Figure 21:
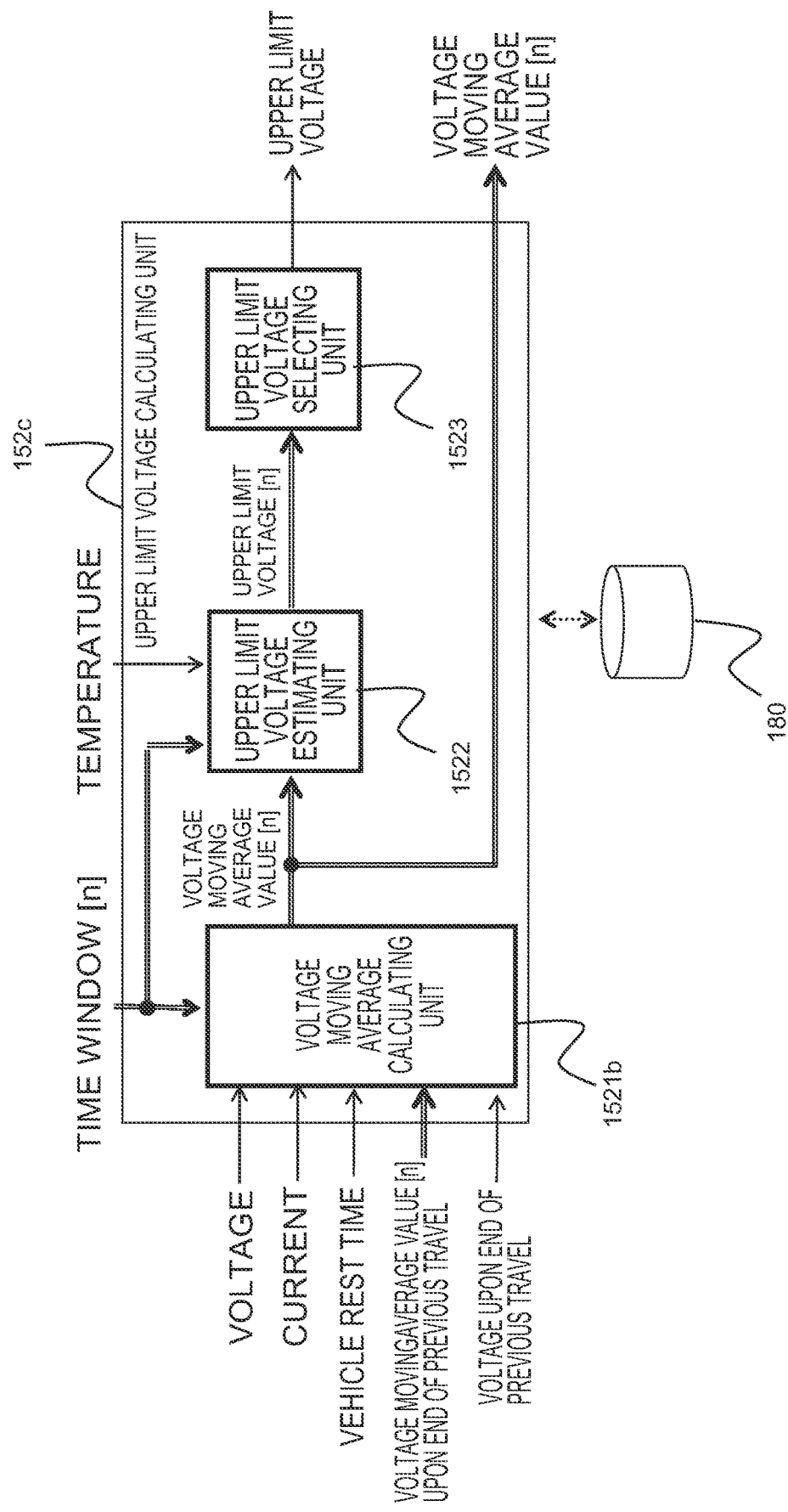
FIG. 21 is a diagram showing an outline of an upper limit voltage map according to the fifth embodiment of the present invention.

Next, the upper limit voltage calculating unit 152c will be described with reference to FIG. 21. A major difference from the first to third embodiments is that the upper limit voltage calculating unit 152c has a voltage moving average calculating unit 1521b in place of the voltage moving average calculating unit 1521. A vehicle rest time, a voltage moving average value upon end of a previous travel, and a voltage upon the end of the previous travel are added to the voltage moving average calculating unit 1521b as input.

Figure 22:
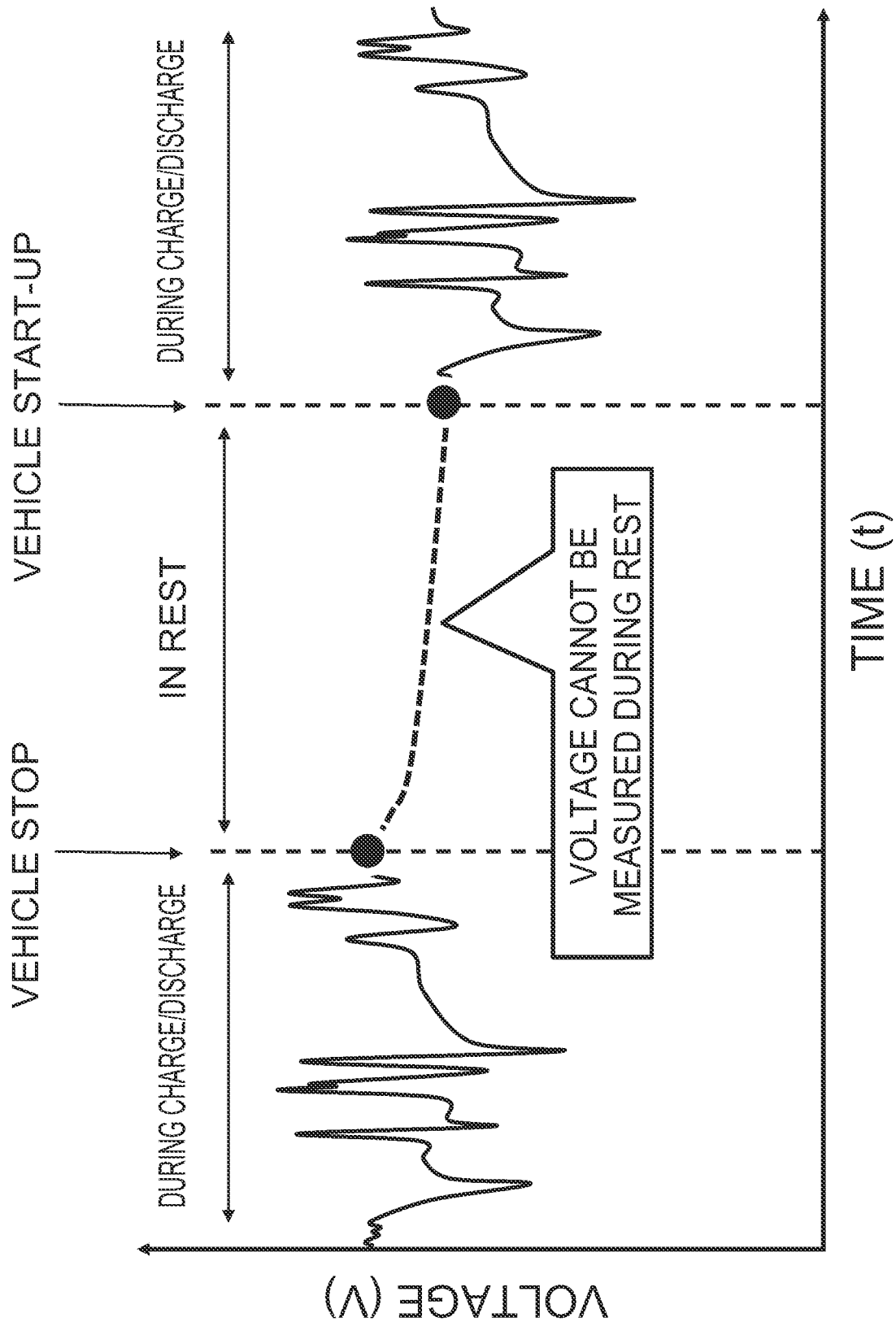
FIG. 22 is a diagram showing an example representing behavior of a voltage during a vehicle rest period.

Processing contents in the voltage moving average calculating unit 1521b will be described with reference to FIGS. 22 and 23. FIG. 22 is a diagram that explains an issue to be solved by the present embodiment. When charge/discharge ends, a vehicle system stops, and the vehicle starts up after rest, charge/discharge is restarted. During a rest period, while a battery system is unable to measure a voltage, a polarization voltage (an overvoltage accompanying an electrochemical reaction of a battery or an overvoltage accompanying a diffusion of lithium ions and corresponds to Vp in FIG. 8) of the battery that occurs with charge/discharge in the battery voltage is alleviated or, in other words, the battery voltage approaches the open circuit voltage (OCV) shown in FIG. 8. Therefore, the voltage changes as the rest period elapses as shown in FIG. 22.

Figure 23:
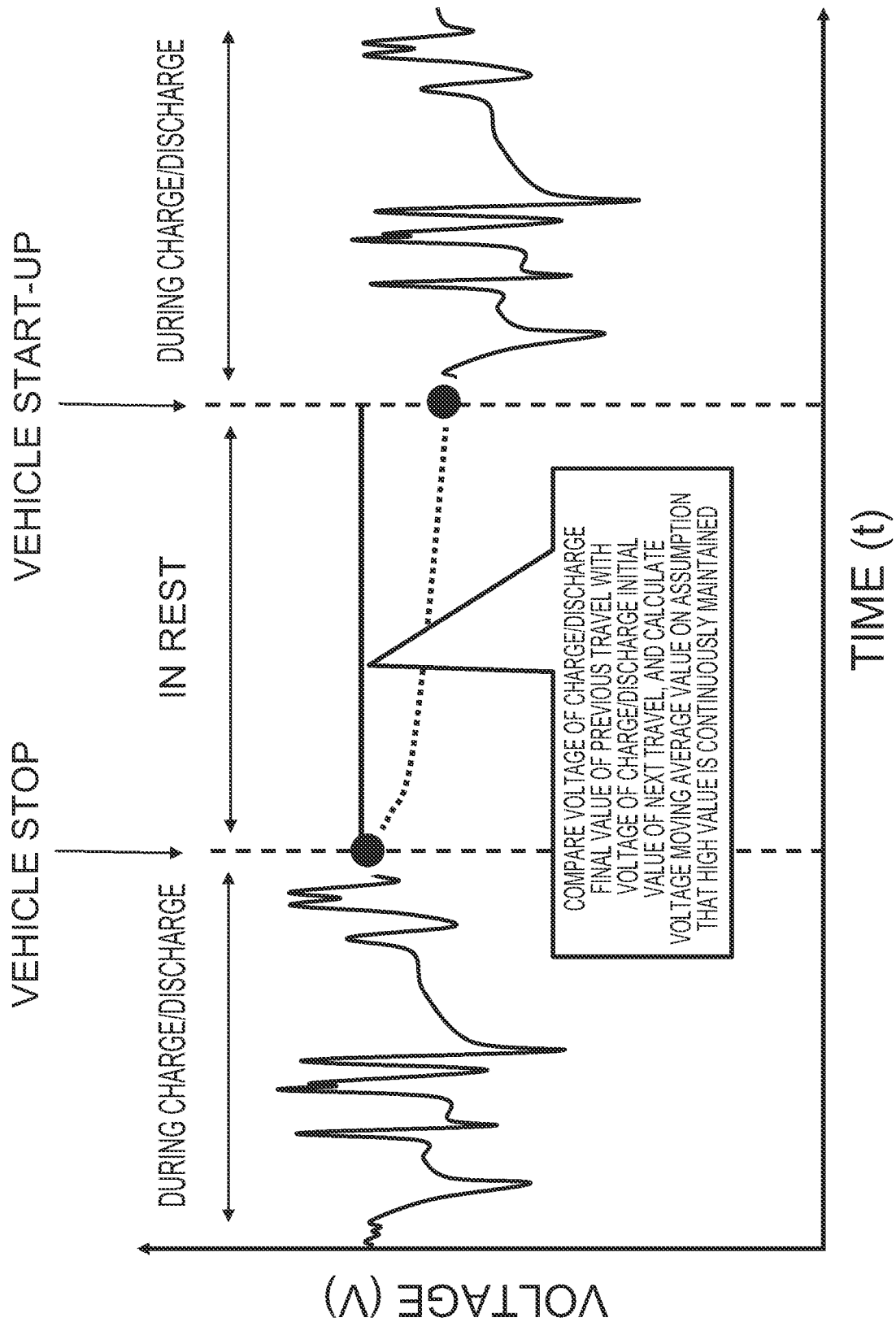
FIG. 23 is a diagram showing a concept of a voltage value during rest according to the fifth embodiment of the present invention.

FIG. 23 shows a concept of an initial value of a voltage moving average value upon vehicle start-up according to the present embodiment. As shown in FIG. 23, as a voltage during the rest period, any value of the voltage during the rest period that is acquired before and after the rest or, in other words, any of a voltage upon end of a previous travel and a voltage value upon a present start-up is adopted upon vehicle start-up. In doing so, from the perspective of suppressing deposition of metal lithium, a larger value among the voltage upon end of the previous travel and the voltage value upon the present start-up is adopted as a safe-side value, and the initial value of the voltage moving average value is determined on the assumption that the adopted value is always maintained throughout the rest period.

The initial value of the voltage moving average value can be obtained by mathematical expression (15) based on a voltage moving average value upon end of a previous travel, a voltage during a rest period, and a vehicle rest time.

[Math. 15]

Mathematical expression (15)

$$Vave\_init(Tw) = PrevVave(Tw) + \left(1 - \exp\left(-\frac{RestTime}{Tw}\right)\right) \times (Vrest - PrevVave(Tw))$$

In mathematical expression (15), PrevVave denotes the voltage moving average value upon end of a previous travel, RestTime denotes the rest time, and Vrest denotes the voltage during the rest period. A larger value among the voltage upon end of the previous travel and the voltage value upon the present start-up described above is set as Vrest described in mathematical expression (15).

When the vehicle neglect time is sufficiently long relative to a filter time constant that is set for each time window or, in other words, when the initial value of the voltage moving average value can be handled as Vrest, the value upon the present start-up is set as Vrest and the calculation according to mathematical expression (15) is executed or Vrest is set as the initial value of the voltage moving average value.

In addition, while mathematical expression (15) describes a method of determining an initial value of a voltage history that takes a calculation using an exponential moving average into consideration, a calculation using a simple moving average can be reflected onto a calculation of an initial value by the same thinking. Specifically, in the number of voltage arrays (Vk in mathematical expression (1)) corresponding to a time window, values are substituted into the set Vrest value starting from a value acquired at an oldest time point among the voltage arrays in the number of elements of time that corresponds to the vehicle rest time.

After the initial value of the voltage history (voltage moving average value) is calculated, averaging processing described in mathematical expressions (1) and (2) is restarted to calculate the voltage moving average value during charge/discharge and, at the same time, estimate an upper limit voltage based on the calculated voltage moving average value.

According to the fifth embodiment of the present invention described above, the voltage moving average calculating unit 1521b is capable of setting an initial value of a voltage history in a direction of suppressing deposition of metal lithium by taking into consideration behavior of a voltage in a vehicle rest time during which the voltage cannot be measured. Accordingly, as a result, an even more appropriate upper limit voltage can be set in consideration of deposition of metal lithium in consideration of a current value of the battery.

While an example of a case where a lithium-ion battery is used as a secondary battery has been explained in the respective embodiments described above, similar charge/discharge control can also be realized when using other secondary batteries. In other words, in addition to a lithium-ion battery, by applying the present invention to any other secondary battery, an appropriate upper limit voltage can be set to enable maximum charging performance of the secondary battery to be exhibited while effectively suppressing degradation of the secondary battery.

It is to be understood that the embodiments and the various modifications described above are merely examples and that the present invention is not limited to contents thereof as long as features of the invention are not adversely affected. In addition, the respective embodiments described above can be used in any combination thereof. Furthermore, while various embodiments and modifications have been explained above, the present invention is not limited to contents thereof. Other modes that are conceivable within the scope of the technical ideas of the present invention are also included in the scope of the present invention.

REFERENCE SIGNS LIST

100 Battery system
110 Assembled battery
111 Single cell
112 Single cell group
120 Single cell managing unit
121 Single cell control unit
122 Voltage detection circuit
123 Control circuit
124 Signal input/output circuit
125 Temperature detecting unit
130 Current detecting unit
140 Voltage detecting unit
150 Assembled battery control unit
151 Battery state detecting unit
152 Upper limit voltage calculating unit
153 Chargeable power calculating unit
154 Power limit ratio calculating unit
155 Power limit ratio reflecting unit
160 Signal communication means
170 Insulating element
180 Storage unit
200 Vehicle control unit
300 to 330 Relay
400 Inverter
410 Motor generator
1521 Voltage moving average calculating unit
1522 Upper limit voltage estimating unit
1523 Upper limit voltage selecting unit
1524 Current moving average calculating unit

The invention claimed is:

1. A method for estimating an upper limit voltage of a secondary battery based on a voltage of the secondary battery, the method comprising:
calculating a voltage history of the secondary battery based on time series data of a voltage of the secondary battery and calculates the upper limit voltage based on the voltage history,
wherein the voltage history is calculated by a simple moving average of a voltage of the secondary battery that corresponds to a predetermined time width in the time series data or an exponential moving average obtained by weighted— averaging the voltage in accordance with a time constant.

2. The method according to claim 1, further comprising determining the upper limit voltage based on the voltage history and a temperature of the secondary battery.

3. The method battery control apparatus according to claim 1, further comprising:
determining the upper limit voltage based on the voltage history and a current of the secondary battery.

4. The method according to claim 1, further comprising the upper limit voltage calculating unit is configured to determine
determining a weight coefficient for adjusting a degree, by which a voltage of the secondary battery is reflected onto the moving average, based on one of or both of a current and a voltage of the secondary battery, and calculate a simple moving average or the exponential moving average of the voltage based on the determined weight coefficient.

5. The method according to claim 4, wherein
with the weight coefficient for adjusting a degree, by which the voltage is reflected onto the moving average, a higher one of or both of a charge current that flows through the secondary battery and a voltage, a larger the degree, by which the voltage is reflected onto the moving average becomes.

6. The method battery control apparatus according to claim 1, further comprising
determining an initial value of the voltage history at a time point of restart of charge/discharge of the secondary battery after a suspension time has elapsed, wherein the initial value is determined using a larger voltage value of:
a voltage of the secondary battery at a time point when charge/discharge of the secondary battery has been suspended; and a voltage of the secondary battery at a time of restart of charge/discharge after the suspension time has elapsed.

7. The method according to claim 6, wherein
when the suspension time of the secondary battery is sufficiently longer than a time width determined in advance, the initial value of the voltage history at a time point of restart of charge/discharge of the secondary battery after the suspension time has elapsed is calculated by adopting a voltage of the secondary battery at a time of restart of charge/discharge after the suspension time has elapsed.

8. The method according to claim 1, wherein
a chargeable maximum current or chargeable maximum power of the secondary battery is calculated based on the upper limit voltage.

9. A battery control apparatus configured to perform the method of claim 1.

10. A method for estimating an upper limit voltage of a secondary battery based on a voltage of the secondary battery, the method comprising:
calculating a plurality of voltage history of the secondary battery based on time series data of a voltage of the secondary battery and calculates the upper limit voltage based on the voltage history, wherein
the plurality of voltage histories are determined by calculating a voltage history respectively with respect to a plurality of time windows with different time widths, and setting a smallest upper limit voltage, among a plurality of upper limit voltages calculated based on the plurality of voltage histories, as the upper limit voltage of the secondary battery.

11. A battery control apparatus configured to perform the method of claim 10.

* * * * *